US011906642B2

(12) United States Patent
Knaappila

(10) Patent No.: US 11,906,642 B2
(45) Date of Patent: Feb. 20, 2024

(54) SYSTEMS AND METHODS FOR MODIFYING INFORMATION OF AUDIO DATA BASED ON ONE OR MORE RADIO FREQUENCY (RF) SIGNAL RECEPTION AND/OR TRANSMISSION CHARACTERISTICS

(71) Applicant: Silicon Laboratories Inc., Austin, TX (US)

(72) Inventor: Jere M. Knaappila, Evitskog (FI)

(73) Assignee: Silicon Laboratories Inc., Austin, TX (US)

( * ) Notice: Subject to any disclaimer, the term of this patent is extended or adjusted under 35 U.S.C. 154(b) by 1277 days.

(21) Appl. No.: 16/145,652

(22) Filed: Sep. 28, 2018

(65) Prior Publication Data

US 2020/0103486 A1  Apr. 2, 2020

(51) Int. Cl.
*G01S 3/808* (2006.01)
*G01S 3/74* (2006.01)
(Continued)

(52) U.S. Cl.
CPC .............. *G01S 3/8083* (2013.01); *G01S 3/74* (2013.01); *G01S 5/04* (2013.01); *H04B 1/207* (2013.01); *H04R 1/10* (2013.01)

(58) Field of Classification Search
CPC .. H04R 2430/01; H04R 2420/07; H04R 3/12; H04R 2225/43; H04R 25/70;
(Continued)

(56) References Cited

U.S. PATENT DOCUMENTS

| 4,405,832 A | 9/1983 | Soundermeyer |
| 5,148,180 A | 9/1992 | Beyer et al. |

(Continued)

FOREIGN PATENT DOCUMENTS

| CN | 101263739 | 9/2008 |
| CN | 102647944 | 8/2012 |

(Continued)

OTHER PUBLICATIONS

Knaappila, Search Report, Chinese Application No. 2019106742741; Filed Jul. 25, 2019,3 pgs.
(Continued)

*Primary Examiner* — Olumide Ajibade Akonai
(74) *Attorney, Agent, or Firm* — Egan, Enders & Huston LLP.

(57) ABSTRACT

Systems and methods are provided that may be implemented to modify information of an audio data transmission based on one or more measured signal reception and/or transmission characteristics of a radio frequency (RF) signal data transmission that contains or otherwise conveys the audio data transmission. The modified audio data may then be acoustically reproduced in analog form as sound waves. Examples of signal reception characteristics of a RF signal data transmission that may be measured and used as a basis for modifying information of audio data of an audio data transmission include, but are not limited to, time Difference of Arrival (TDOA), Angle of Arrival (AoA), measured received signal strength, etc. Example signal transmission characteristics of a RF signal that may be measured and used as a basis for modifying information of audio data include, but are not limited to, Angle of Departure (AoD).

35 Claims, 12 Drawing Sheets

(51) Int. Cl.
*H04B 1/20* (2006.01)
*G01S 5/04* (2006.01)
*H04R 1/10* (2006.01)

(58) Field of Classification Search
CPC .... H04R 2499/11; H04R 25/505; H04R 5/04; H04R 29/001; H04R 2225/41; H04R 2499/13; H04R 2460/07; H04R 1/10; H04R 2430/00; H04R 1/1091; G06F 3/165; G10L 21/0208; G10L 21/0232; G10L 15/20; G10L 21/0216; G10L 21/0316; G10L 21/013; H04W 76/15; H04W 4/80; H04W 76/14; G01S 5/021; G01S 3/8083; G01S 5/04; G01S 3/28; G01S 3/74; G01S 3/46; H04B 1/207; H04B 15/00; H04B 15/04; H04B 1/64; H04B 17/318; H01Q 1/1257; H04M 1/6505

See application file for complete search history.

(56) References Cited

U.S. PATENT DOCUMENTS

| | | | |
|---|---|---|---|
| 6,839,440 B1* | 1/2005 | Shimbo | H03G 3/3005 455/234.1 |
| 8,472,652 B2 | 6/2013 | Harma | |
| 8,723,729 B2 | 5/2014 | Desai et al. | |
| 8,965,284 B2 | 2/2015 | Honkanen et al. | |
| 9,078,076 B2 | 7/2015 | Furse | |
| 9,351,071 B2 | 5/2016 | Kechichian et al. | |
| 9,354,292 B2 | 5/2016 | Burrell et al. | |
| 9,503,841 B2 | 11/2016 | Knaappila | |
| 9,602,946 B2 | 3/2017 | Karkkainen et al. | |
| 9,699,586 B2 | 7/2017 | Balabanis et al. | |
| 9,763,020 B2 | 9/2017 | Lang et al. | |
| 9,773,506 B2 | 9/2017 | Furse | |
| 10,049,686 B1* | 8/2018 | Hera | G10L 21/0232 |
| 10,490,200 B2 | 11/2019 | Furse | |
| 2007/0036366 A1* | 2/2007 | Konagai | H04R 3/12 381/61 |
| 2007/0129022 A1* | 6/2007 | Boillot | G10L 25/69 704/E19.002 |
| 2008/0288247 A1* | 11/2008 | Young | H03M 3/022 704/214 |
| 2009/0262954 A1* | 10/2009 | Lin | H03G 3/345 381/107 |
| 2010/0054486 A1* | 3/2010 | Sollenberger | H03G 5/165 381/55 |
| 2010/0262266 A1* | 10/2010 | Chang | H04H 20/106 700/94 |
| 2011/0143683 A1 | 6/2011 | Sridhara et al. | |
| 2012/0308013 A1* | 12/2012 | Kim | H04B 15/04 381/2 |
| 2013/0024018 A1* | 1/2013 | Chang | H04S 7/302 700/94 |
| 2013/0041648 A1 | 2/2013 | Osman | |
| 2013/0156209 A1* | 6/2013 | Visser | H04M 9/082 381/66 |
| 2013/0259221 A1* | 10/2013 | Shusaku | H04M 1/02 379/390.01 |
| 2014/0321321 A1 | 10/2014 | Knaappila | |
| 2015/0077051 A1 | 3/2015 | Kim et al. | |
| 2015/0162008 A1* | 6/2015 | Villette | G10L 21/038 704/500 |
| 2015/0271628 A1 | 9/2015 | Knaappila | |
| 2015/0281864 A1* | 10/2015 | Song | H04R 29/00 381/56 |
| 2015/0319600 A1 | 11/2015 | Knaappila | |
| 2016/0098244 A1* | 4/2016 | Hsieh | G06F 3/165 700/94 |
| 2016/0112840 A1 | 4/2016 | Drucker | |
| 2016/0223640 A1 | 8/2016 | Vilermo et al. | |
| 2017/0094437 A1* | 3/2017 | Kadri | H04R 3/12 |
| 2017/0276764 A1 | 9/2017 | Vilermo et al. | |
| 2018/0007523 A1 | 1/2018 | Knaappila | |
| 2018/0048767 A1* | 2/2018 | Tinsman | H04L 41/0681 |
| 2018/0152917 A1 | 5/2018 | Knaappila et al. | |
| 2018/0176776 A1 | 6/2018 | Knaappila | |
| 2018/0227975 A1* | 8/2018 | Kihlberg | H04R 5/033 |
| 2018/0278224 A1* | 9/2018 | Kosuge | H03G 5/165 |
| 2019/0037419 A1 | 1/2019 | Knaappila | |
| 2019/0231233 A1* | 8/2019 | Turner | G16H 40/67 |
| 2019/0313158 A1* | 10/2019 | Liang | H04N 21/41407 |
| 2020/0106496 A1 | 4/2020 | Kagitapu et al. | |

FOREIGN PATENT DOCUMENTS

| | | |
|---|---|---|
| CN | 103229518 | 7/2013 |
| CN | 104041075 | 9/2014 |
| CN | 104581610 | 4/2015 |
| CN | 104823070 | 8/2015 |
| CN | 107079264 | 8/2017 |
| CN | 107211216 | 9/2017 |
| IN | 102318372 | 1/2012 |
| WO | 2007033150 | 3/2007 |
| WO | 2009022278 | 2/2009 |
| WO | 2011015675 | 2/2011 |
| WO | 2011043678 | 4/2011 |
| WO | 2013108147 | 7/2013 |
| WO | 2014053877 | 4/2014 |
| WO | 2016030572 | 3/2016 |
| WO | 2016097477 | 6/2016 |

OTHER PUBLICATIONS

Wikipedia, "Stokes's Law Of Sound Attenuation", Printed from Internet Aug. 2, 2018, 3 pgs.
Wikipedia, "Sound Localization", Printed from Internet Jul. 4, 2018, 8 pgs.
Michaelevsky et al., "PowerSpy: Location Tracking Using Mobile Device Power Analysis", Publically available prior to Sep. 28, 2018 filing date of the current patent application, 16 pgs.
Cnet, "Can You Handle The Truth? Everybody Loves The Sound Of Distorted Music", Nov. 5, 2014, 2 pgs.
Healthy Hearing, Bluetooth Hearing Aids, May 1, 2018, 6 pgs.
Knaappila, "Systems And Methods For Multiantenna Orientation And Direction Detection", U.S. Appl. No. 15/663,326, filed Jul. 28, 20917,50 pgs.
Knaappila, "Systems And Methods For Adaptive Scanning And/Or Advertising", U.S. Appl. No. 15/650,405, filed Jul. 14, 2017, 57 pgs.
Gunhardson, "Indoor Positioning Using Angle Of Departure Information", 2015, 86 pgs.
Dhope, "Application Of Music, Esprit and Root Music In DOA Estimation", University of Zagreb, 2010, 5 pgs.
Xiong et al., "SecureAngle: Improving Wireless Security Using Angle Of Arrival Information", ACM, 2010, 6 pgs.
Gotsis et al., "Multiple Signal Direction Of Arrival (DOA) Estimation For A Switched Beam System Using Neural Networks", Piers Online, vol. 3, No. 8, 2007, 5 pgs.
Gustafsson et al., "Positioning Using Time Difference Of Arrival Measurements", Department of Electrical Engineering, Linkoping University, Publically available prior to Sep. 28, 2018 filing date of the current patent application, 4 pgs.
Lehtimaki, "Understanding Advanced Bluetooth Angle Estimation Techniques For Real-Time Locationing", Embedded World, Obtained from Internet May 14, 2018, 18 pgs.
Knaappila, "Systems And Methods For Selecting Operating Mode Based On Relative Position Of Wireless Devices", U.S. Appl. No. 16/145,592, filed Sep. 28, 2018, 66 pgs.

* cited by examiner

SYSTEMS AND METHODS FOR MODIFYING INFORMATION OF AUDIO DATA BASED ON ONE OR MORE RADIO FREQUENCY (RF) SIGNAL RECEPTION AND/OR TRANSMISSION CHARACTERISTICS

FIELD

The disclosed systems and methods relate to wireless communication and, more particularly, to modifying information of an audio data transmission based on radio frequency (RF) signal reception and/or transmission characteristics.

BACKGROUND

Bluetooth Low Energy (BLE) relates to Bluetooth wireless radio technology. It has been designed for low-power and low latency applications for wireless devices within short range. Today, BLE applications can be found from healthcare, fitness, security, smart energy, industrial automation and home entertainment. However, BLE is not limited to only those, but increasingly more new application utilizing BLE technology are designed. Specifications for BLE are defined in Bluetooth 4.x (such as Bluetooth 4.0, 4.1, 4.2) and Bluetooth 5 core version specification by the Bluetooth Special Interest Group (SIG).

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

In BLE technology, one or more so called slave devices can be connected to a master device. To let the master know about the slave devices before connection, the slave devices (or at that point "advertisers") periodically, at pseudo-random intervals, pass advertising packets which the master device (also known as scanner device, i.e. "scanner") is scanning. Depending on the type of advertising packet sent by an advertiser device, the scanner device may respond to the received advertising packet by requesting a connection with the advertiser device, or may respond by requesting further information from the advertiser device. Beacons are a particular type of BLE advertiser device that transmit advertising packets with a unique identifier to nearby portable electronic devices such as smart phones. An application on a portable electronic device may respond to information within an advertising packet received from a beacon by performing an action, such as approximating the location of the portable device. After an advertiser device and scanner device become connected as master and slave, the master device may request bonding with the slave device. This means that the devices exchange long term keys or other encryption info to be stored for future connections. In another case, the master device may request pairing with the slave device, in which case the connection may be encrypted only for the duration of the current connection, during which short term keys are exchanged between the master device and slave device.

BLE wireless signals have been employed to transmit multichannel audio data from a wireless transmitting device, such as a smart phone, to wireless audio reproduction device/s that decode the multichannel audio data from the BLE signal and reproduce the corresponding multichannel audio for a listener. Examples of such wireless audio reproduction devices include wireless stereo headphones, wireless stereo room speakers, and wireless home theater surround sound speakers.

SUMMARY

Disclosed herein are systems and methods for modifying information of an audio data transmission based on one or more signal reception and/or transmission characteristics of a radio frequency (RF) signal data transmission (e.g., such as transmission of a Bluetooth Low Energy "BLE" connection) that contains or otherwise conveys the audio data transmission, e.g., the audio data transmission may be inside the RF signal data transmission. Using the disclosed systems and methods, the modified audio data may be acoustically reproduced in analog form as sound waves, e.g., at the location where the RF signal is received or at any other desired or otherwise designated location. Besides the BLE protocol, the disclosed systems and methods may be employed in similar fashion with any other wireless protocol over which audio is transferred, and for which signal transmission and/or reception characteristics of this transfer protocol may be measured and audio data information modified accordingly. Examples of other such protocols include, but are not limited to, IEEE 80211x (e.g., such as 802.11a/b/g/n/) Wi-Fi, ZigBee, IEEE 802.15.4, AM/FM radio, etc.

Examples of signal reception characteristics of a radio frequency (RF) signal data transmission that may be measured and used as a basis for modifying information of audio data of the audio data transmission include, but are not limited to, Time of Arrival (TOA), Time Difference of Arrival (TDOA) of a RF signal received at separate antenna elements of an antenna array of a wireless audio receiver device, TOA of a RF signal received at one or more antenna elements of a wireless audio receiver device (e.g., including a RF signal received at a single antenna of an antenna array of a wireless audio receiver device that has an atomic clock or otherwise corrected clock that is synchronized with an atomic clock or similar accuracy clock of a wireless device that is transmitting the RF signal with transmission time information), Angle of Arrival (AoA) of a RF signal received at two or more antenna elements of an antenna array of a wireless audio receiver device, measured received signal strength (e.g., received signal strength indicator (RSSI) or received signal decibel-milliwatts (dBm)) of a RF signal received at one or more antenna elements of a wireless audio receiver device (e.g., including at different antenna elements of an antenna array of a wireless audio receiver device), etc. Example signal transmission characteristics of a radio frequency (RF) signal that may be measured and used as a basis for modifying information of audio data include, but are not limited to, Angle of Departure (AoD) of a signal transmitted from an antenna array of a wireless audio transmitter device to a wireless audio receiver device.

In one exemplary embodiment, audio data information may be modified based on relative position of a wireless audio transmitter device to a wireless audio receiver device that is configured to receive a wireless RF signal containing the audio data that is transmitted from the wireless transmitter device, and to acoustically reproduce the modified audio information from the audio data. In such an embodiment, the relative position of the wireless audio transmitter to the wireless audio receiver may be determined based on one or more signal reception or transmission characteristics of the RF signal containing the audio data.

Examples of types of modifications that may be made to audio data information based on RF signal reception or transmission characteristics include, but are not limited to, varying the volume (or gain), tone, equalization and/or pitch of the audio sound waves that are acoustically reproduced from the audio data information, individually varying the volume of the sound waves that are acoustically reproduced from the audio data information simultaneously at different respective speakers (e.g., so as to vary the audio balance between left and right hearing aid speakers or left and right headphone speakers worn in or over the left and right ears of an individual), etc.

In one exemplary embodiment, a wireless receiver device having one or more audio speakers may be configured with circuitry to measure the received signal strength of a received RF signal transmission that contains or otherwise conveys the audio data, and then to modify information of the audio data to vary the volume of the acoustic sound waves produced by the audio speakers from the audio data. For example, the wireless receiver device may attenuate the volume of the acoustically reproduced sound waves from the audio data based on the measured signal strength to simulate to a user of the wireless receiver device the distance from the wireless receiver device to the wireless transmitter device that is transmitting the RF signal with its audio data to the wireless receiver device, e.g., by applying relatively lesser attenuation or more gain (to produce higher acoustic sound wave volume) for relatively greater values of measured signal strength and by applying relatively greater attenuation or less gain (to produce lower acoustic sound wave volume) for relatively lesser values of measured signal strength.

In another exemplary embodiment, a wireless receiver device having multiple spaced-apart audio speakers may be configured with circuitry to measure angle of arrival (AoA) of a received RF signal transmission that contains or otherwise conveys multiple separate channels of audio data that each correspond to a different one of the multiple audio speakers. The wireless receiver circuitry may be further configured to modify information of one or more of the different channels of the received audio data so as to vary the relative volume of the acoustic sound waves produced by the different spaced-apart audio speakers from the channels of audio data, e.g., by varying the volume level information of received audio data that has first and second audio channels that have the same volume level information to produce modified audio data having first and second audio channels that have different volume level information (e.g., first audio channel volume greater than second channel volume, or vice-versa).

For example, the wireless receiver device may adjust the left-right channel volume (i.e., balance) of two separate hearing aid speakers or two separate head phone speakers to match the angle from which the RF signal is received at the receiver device, e.g., to produce greater left side volume to match a measured AoA that indicates a RF signal that is received at the left side of the wireless device and to produce greater right side volume to match a measured AoA of a RF signal that indicates a RF signal is received is from the right side of the wireless device. In an alternative example where a wireless receiver device is only capable of monaural acoustic sound wave reproduction (e.g., having a single speaker or multiple monaural-producing speakers), the measured AoA may be used to otherwise modify acoustic characteristics of the acoustic sound waves produced by the speakers to indicate to a user the direction from which the RF signal is received, e.g., such as by raising the pitch by an incremental amount (e.g., incremental percentage) of the monaural acoustic sound waves produced by the speaker/s when measured AoA of a RF signal indicates a RF signal is received is from the left side of the wireless device and lowering the pitch by an incremental amount (e.g., incremental percentage) of the monaural acoustic sound waves produced by the speaker/s when measured AoA of a RF signal indicates a RF signal is received is from the right side of the wireless device.

In yet another exemplary embodiment, a wireless receiver device having one or more audio speakers may be configured with circuitry to dynamically measure over time the real time changes in one or more signal reception and/or transmission characteristics of a received RF signal transmission that contains or otherwise conveys the audio data. Such a wireless receiver device may be configured to then automatically modify information of the audio data in real time based on the measured changes in signal reception and/or transmission characteristics of the received RF signal transmission. For example, a wireless receiver device may be configured to measure received signal strength of a RF signal and/or AoA received from a moving RF wireless transmitter device over time (e.g., during a predefined time period or continuously) during which the position of the moving wireless transmitter changes relative to the position of the wireless receiver device to cause the received RF signal strength and/or AoA to vary as a function of relative position to the wireless receiver device. The wireless receiver device may be configured to respond to this varying RF signal strength and/or AoA by modifying the audio data information to adjust the pitch of the acoustic sound waves produced by the wireless device speakers according to the varying RF signal strength so as to simulate a Doppler effect produced by a hypothetical acoustic sound wave source that is moving relative to the wireless receiver device in the same manner as the moving wireless transmitter, e.g., so as to allow a user listening to the acoustic sound waves to deduce relative speed of the moving wireless transmitter. Similar methodology would apply when the wireless receiver device is moving relative to the wireless transmitter device, or both wireless receiver device and wireless transmitter device are both moving relative to each other.

Besides volume attenuation and change of pitch, any other suitable type of audio data information modification may be performed by a wireless receiver device based on measured signal reception and/or transmission characteristics of a received RF signal transmission that contains or otherwise conveys the audio data, e.g., such as using speech synthesis to describe in verbal form to a user the distance and/or measured angle to a wireless transmitter device.

In one embodiment, the disclosed systems and methods may be implemented to allow a human user wearing wireless receiver device/s (e.g., wireless headphones or wireless hearing aids), to hear the spatial relative position of the wireless transmitter device and thus determine the direction, distance and/or location of the wireless transmitter device (e.g., doorbell, smoke alarm, door intercom, public address announcement speaker, television, smart phone, left stereo loudspeaker, right stereo loudspeaker, etc.) from which audio data is being conveyed to the wireless receiver device/s by a RF signal transmission. This advantageously allows the user to determine information about where the location of the wireless transmitter device is installed or otherwise located relative to the wireless receiver device/s without previous knowledge of the location of the wireless transmitter device, and without passing wireless transmitter device location information as data to the wireless receiver device/s using another transmission media (e.g., such as side RF channel or other type of signal channel) other than the RF signal transmission that conveys the audio data itself. Moreover, the audio data information may be modified only at the wireless receiver device (and not at the wireless transmitter device) to audibly provide the user with acoustic sound waves from the modified audio data that provides sound location localization information about the relative position of the wireless transmitter device to the wireless receiver device/s without any visual display of location information to the user. This is especially advantageous for hard-of-hearing human users that are wearing hearing aids, or for any human user that is wearing wireless headphones.

Advantageously, the disclosed systems and methods may be implemented in one embodiment to enable a wireless receiver device to receive a RF signal transmission that contains or otherwise conveys unmodified audio data, and does not convey any spatial information (e.g., such as of Angle of Arrival, Received signal strength, Time of Arrival, Polarization, Signal to Noise ratio) that would indicate the relative location of a wireless transmitter device that is transmitting the RF signal. For example, a wireless receiver device configured as a hearing aid may receive a RF signal transmission that conveys only the audio playback information itself, without any user information. In such an embodiment, information (e.g., such as volume (gain or attenuation) control information, tone control information, equalization control information, pitch control information, added audio data such as speech synthesis information, etc.) may be added to the RF signal transmission at the wireless receiver device by changing properties of the audio data or otherwise modifying the audio data to allow a human user to determine from which direction and/or location that the audio data of the received RF signal is coming, e.g., to help create a more natural audio environment for the user. In this way, such a wireless receiver device may receive unmodified audio data conveyed without spatial information by a RF signal that is transmitted by a generic wireless transmitter device having no spatial position determination or transmitting capability (e.g., conventional doorbell, smoke alarm, door intercom, public address announcement speaker, etc.), and then internally modify the information of the received audio data based on a direction, distance and/or location of the wireless transmitter device that is determined by the wireless receiver device.

In one embodiment, the disclosed systems and methods may be implemented using a two-element antenna array that defines a center plane between the elements. The two-element array may be employed on a wireless receiving device to detect from which side (e.g., left or right side) of the center plane a wireless radio frequency (RF) signal is being received from (e.g., based on TDOA of the wireless RF signal at the two antenna elements and/or based on a determination of AoA of the wireless RF signal at the two antenna elements, etc.), and thus which also represents the direction toward the transmitter of the signal. Knowing the direction to the wireless transmitter allows circuitry on the wireless receiving device to modify audio data information based on the direction to the transmitter of a wireless transmitting device to indicate to a human user of the wireless receiving device the direction from which the RF signal is received by the wireless receiving device as described further herein. In one embodiment, a pair of wireless headphones or a dual-ear hearing aid speaker system may be equipped with an antenna array that defines a center plane that bisects the space between the two antenna elements of the array and that extends between the two respective left and right headphones or left and right hearing aid speakers. Knowing which side of the plane from which an incoming signal is received allows that indicates a RF signal is received is from the right side of the wireless device so that the left and/or right side audio data may be accordingly modified to indicate direction from which the RF signal is received as described further herein. As further described herein, audio data (e.g., pitch information) for a single (monaural) speaker may be modified to indicate direction from which the RF signal is received.

In a further alternative embodiment, information of an audio data RF signal transmission may be modified in any of the manners described herein based on spatial positioning information that is shared between a wireless audio transmitter device and a wireless audio receiver device, e.g., such as by using a side signal channel that is separate and different from the audio data RF signal to pass spatial positioning information between the wireless audio transmitter device and a wireless audio receiver device, For example, if both wireless audio transmitter device and wireless audio receiver device are in wireless communication with the Internet (e.g., via IEEE 802.11x Wi-Fi -based RF protocol or via LTE or other cellular-based RF protocol), they may transmit their relative position to each other (or from transmitting device to receiver device) across the Internet, e.g., through a cloud-based service. In one example, both wireless audio transmitter device and wireless audio receiver device may be GPS-enabled. In such an example, the wireless transmitter device may transmit its real time GPS location coordinates across the Internet or other side-channel to the wireless audio receiver device at the same time that the wireless transmitter device is transmitting a RF signal that conveys the audio data directly (i.e., not via the Internet) to the wireless audio receiver device. The wireless audio receiver device may then compare its own current GPS location coordinates to the current GPS location coordinates of the wireless transmitter device to determine in real time at least one of the current position, orientation and/or direction of the audio receiver device to the audio transmitter device. The wireless audio receiver device may then produce modified audio data at the wireless audio device based on this determined position, orientation and/or direction of the audio receiver device to the audio transmitter device by varying the volume (or gain), tone, equalization and/or pitch information of the audio data in a similar manner as described herein for those embodiments that make such modifications based on measured RF signal reception and/or transmission characteristics.

In one respect, disclosed herein is a method, including: receiving a radio frequency (RF) signal at a first device, the RF signal conveying audio data and being transmitted from a second device; measuring one or more RF signal reception or transmission characteristics of the received signal at the first device; producing modified audio data at the first device by modifying information of the conveyed audio data based on the measured RF signal reception or transmission characteristics; and reproducing analog audio acoustic sound waves from the modified audio data.

In another respect, disclosed herein is an apparatus, including at least one programmable integrated circuit coupled to radio circuitry of a first device, the programmable integrated circuit being programmed to operate the first device to: receive a radio frequency (RF) signal at a first device, the RF signal conveying audio data and being transmitted from a second device; measure one or more RF signal reception or transmission characteristics of the received signal at the first device; produce modified audio data at the first device by modifying information of the conveyed audio data based on the measured RF signal reception or transmission characteristics; and reproduce analog audio acoustic sound waves from the modified audio data.

In another respect, disclosed herein is a system, including: a first device having at least one first programmable integrated circuit coupled to radio circuitry of the first device; and a second device having at least one second programmable integrated circuit coupled to radio circuitry of the second device. The second programmable integrated circuit of the second device may be programmed to control operation of the second device to transmit a first RF signal from the second device to the first device; and the first programmable integrated circuit of the first device may be programmed to operate the first device to: receive a radio frequency (RF) signal at a first device, the RF signal conveying audio data and being transmitted from a second device, measure one or more RF signal reception or transmission characteristics of the received signal at the first device, produce modified audio data at the first device by modifying information of the conveyed audio data based on the measured RF signal reception or transmission characteristics, and reproduce analog audio acoustic sound waves from the modified audio data.

DESCRIPTION OF ILLUSTRATIVE EMBODIMENTS

Figure 1:
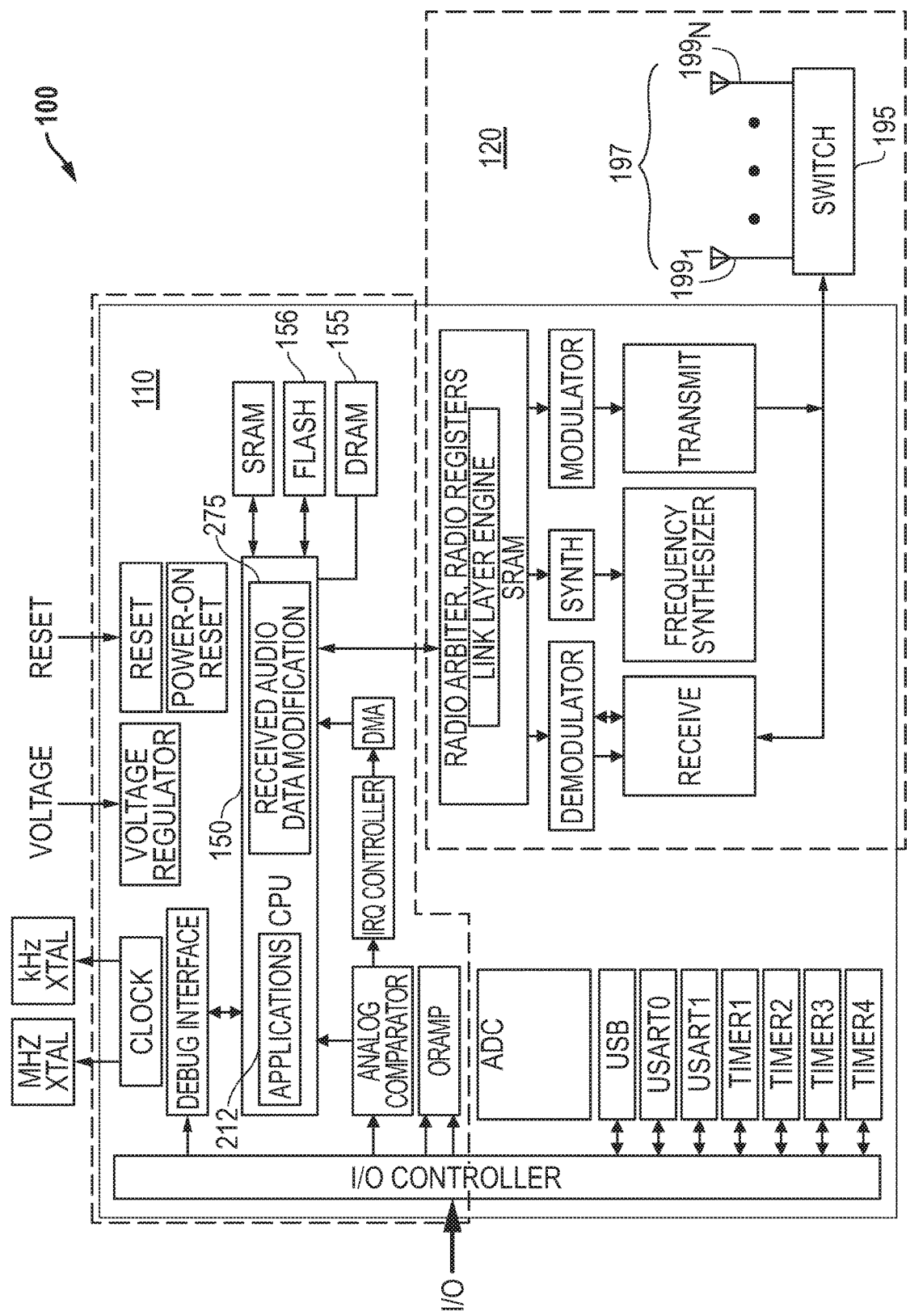
FIG. 1 illustrates a simplified block diagram of a wireless device according to one exemplary embodiment of the disclosed systems and methods.

FIG. 1 illustrates a simplified block diagram of an exemplary wireless device in the form of a BLE module 100 that may be employed to implement the disclosed systems and methods, it being understood that the disclosed systems and methods may be similarly implemented with other types of wireless technologies or protocols besides BLE (e.g., such as ZigBee or IEEE 802.15.4-based wireless technologies). In one exemplary embodiment, all components of BLE module 100 may be implemented as a system on a chip (SoC) or integrated circuit that includes one or more optional antenna array/s 197 and one or more optional antenna switch/es 195 to support side of arrival or angle of arrival detection as further described herein. In another exemplary embodiment, BLE module 100 may be implemented as a system on a chip (SoC) or integrated circuit that includes all components of BLE module 100 except optional antenna array/s 197 and external switch/es 195, which may be externally coupled to other components of BLE module 100.

As shown in FIG. 1, BLE module 100 includes a first module segment 110 that includes one or more central processing units (CPUs), processors or other programmable integrated circuits 150 and memory 155 (e.g., DRAM) with application data. Application/s 212 may be executed by CPU 150 to provide multiple different resources (e.g., such as different Bluetooth services, security manager, parts of a Bluetooth service such as Bluetooth service characteristics, and/or any other computing or wireless operation services) to other connecting radio frequency (RF)-enabled devices across different wireless RF connections (e.g., such as different BLE wireless connections between different BLE devices). CPU 150 may also be programmed to execute received audio data modification logic 275 (e.g., as an application) as described further herein to modify audio data information based on one or more measured signal reception and/or transmission characteristics of a received RF signal data transmission that conveys the audio data transmission, e.g., and in one embodiment to determine a relative position of BLE module 100 to a wireless transmitter device based on the one or more measured signal reception and/or transmission characteristics and then to modify the audio data information based on same.

Still referring to FIG. 1, a second module segment 120 is configured to implement a part of a link layer and physical layer for radio module 100, and includes radio components and circuitry such as radio registers, link layer engine, modulator-demodulator, receiver and transmitter (transceiver), frequency synthesizer, balancing-unbalancing unit ("balun"), one or more antennas ("ant/s"). In one embodiment, second module segment 120 may include memory and one or more microcontrollers, processors, programmable logic devices (PLDs), or other programmable integrated circuits programmed or otherwise configured to execute one or more components of module segment 120, e.g., such as a link layer engine.

In one exemplary embodiment, the physical radio (RF) portion of module segment 120 may be optionally configured to determine a measurement of received signal strength such as received signal decibel-milliwatts (dBm) or Received Signal Strength Indicator (RSSI) in order to measure a power of the received radio signal. The received signal strength may be calculated from any packets in advertisement/broadcasting state or connected state. The determined received signal strength may also be used, e.g., for approximating the distance between two BLE devices. When a packet is received from another BLE device by BLE module 100, a RSSI value may be determined from it, and used for determining the distance between BLE module 100 and the BLE device by using known distance determination algorithms. In one embodiment, processing components of second module segment 120 may be programmed to determine direction of arrival and/or side of arrival of a signal received from another device (e.g., such as a BLE device) at separate individual antenna elements of an antenna array, i.e., with greater received signal strength being measured at the antenna element/s positioned closest to the transmitting device and weaker received signal strength measured at the antenna element/s positioned further away from the transmitting device, which thus allows relative distance from the signal source to be determined for each antenna element. Further information on RSSI determination and distance determination may be found, for example, in U.S. patent application ser. no. 2015/0271628, which is incorporated herein by reference in its entirety for all purposes.

In another exemplary embodiment, second module segment 120 may be additionally or alternatively configured to determine side of arrival or angle of arrival (AoA) of a signal received from another device (e.g., such as a BLE device). For example, two or more antenna elements $199_1$ to $199_N$ of second module segment 120 may be configured as a switched antenna array 197 or other suitable type of direction finding array that is coupled to integrated circuit components of second module 120 that are programmed to determine side of arrival or AoA of a signal received from another device by measuring amplitude and/or phase of the signal at each antenna element 199 in the antenna array 197, for example, as described in U.S. patent application ser. no. 2018/0176776 and in United States Patent Application Serial No. 15/663,326 filed on Jul. 28, 2017, each of which is incorporated herein by reference in its entirety for all purposes. In one embodiment, side of arrival or angle of arrival (AoA) of a signal received from another device may be so determined using only a single antenna array 197 having multiple antenna elements 199, and in another exemplary embodiment processing components of second module 120 may be programmed to determine side of arrival or AoA of a signal received from another device based on a determined angle of departure (AoD) of the received signal from another BLE device as described in United States Patent Application Publication Number 2018/0176776 and in U.S. patent application Ser. No. 15/663,326 filed on Jul. 28, 2017, each of which is incorporated herein by reference in its entirety for all purposes.

In some embodiments, optional antenna array 197 may be replaced by a single antenna element $199_1$ coupled to other components (e.g., receiver, transmitter and frequency synthesizer components) of module 120 without switch 195 therebetween. Such a single antenna element may be employed, for example, to measure received signal strength of a RF signal received at the single antenna element $199_1$ and to perform audio data information modification (e.g., to adjust the acoustic gain of the sound waves of the reproduced audio data) based on the value of received signal strength measured at the single antenna element $199_1$.

In one embodiment the one or more programmable integrated circuits, memory, and clock circuitry of module segment 110 may be coupled to each other and to components of module segment 120 through a system bus interconnect or one or more other types of suitable communication media, including one or more electrical buses and/or intervening circuitry that provides electrical communications. In certain embodiments, memory of module segments 110 and 120 may contain instructions which, when executed by programmable integrated circuits of BLE module 100, enable the BLE module 100 to operate as a BLE device to perform the functions described herein. Memory of BLE module 100 may be implemented, for example, using one or more non-volatile memories 156 (e.g., FLASH read-only-memories (ROMs), electrically programmable ROM (EPROMs), and/or other non-volatile memory devices) and/or one or more volatile memories (e.g., dynamic random access memories (DRAMs), static random access memories (SRAM) and/or other volatile memory devices).

Second module segment 120 includes circuitry that operates as a wireless interface for first module segment 110 and that is coupled to one or more antennas as shown. Second module segment 120 may include a radio that includes baseband processing, MAC (media access control) level processing, beamforming or TDOA processing, and/or other physical layer processing for BLE packet communications. The programmable integrated circuits of first module segment 110 and second module segment 120 may also read and write from the various system memory during operations, for example, to store packet information being received from or transmitted to another BLE device. Although not shown, BLE module 120 may also be coupled receive power from a power supply, which may be a battery or a connection to a permanent power source such as a AC mains wall outlet.

Figure 2:
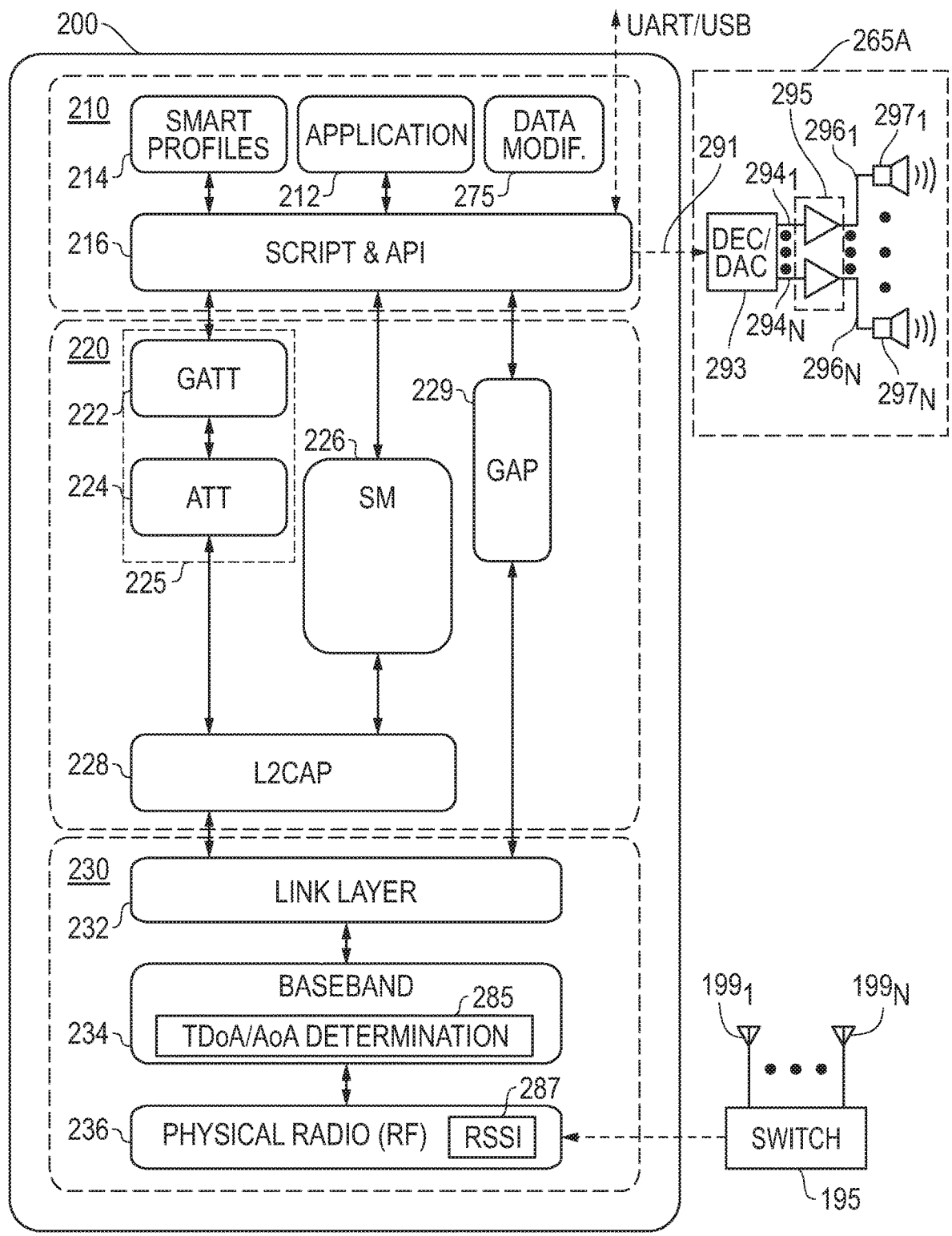
FIG. 2 is a simplified illustration of components of a Bluetooth smart module according to one exemplary embodiment of the disclosed systems and methods.

FIG. 2 is a simplified illustration of application, host and BLE control components of a Bluetooth smart module 200 configured and coupled to audio-related external non-radio circuitry and/or hardware 265A according to one exemplary embodiment of the disclosed systems and methods. Components of Bluetooth smart module 200 may be implemented, for example, using the hardware components of radio module 100 or any other suitable combination of radio hardware components. As shown in FIG. 2, Bluetooth smart module 200 of this embodiment includes application layer 210, host layer 220 and a Bluetooth (or BLE) controller 230. Application layer 210 may include, for example, apparatus-related application/s 212 (e.g., heart rate, proximity, blood pressure, time update, temperature, battery, lighting control, home automation control, audio reproduction and output control, audio creation and input control, etc.), smart profiles 214, and script and application programming interface (API) 216. Host layer 220 includes protocols running over the connection.

Other examples of application/s 212 include, but are not limited to, apparatus-related applications, such as a wireless RF audio transmitter application for transmitting RF signals including streaming (e.g., Internet) and/or locally stored or created audio data (e.g., such as audio data digitized from real time analog sound wave input to a wireless door intercom device such as voice input by a visitor standing outside a door, audio data transmitted as an alert by a wireless smoke alarm device upon detection of fire and/or smoke, audio data transmitted as an alert sound by a wireless doorbell device upon activation of the doorbell device by a visitor outside a door, recorded or live real time audio data transmitted as a voice announcement by a wireless public address device, etc.) for reproduction as acoustic sound waves at a remote wireless audio receiver device. Other examples of application/s 212 include, but are not limited to, apparatus-related applications, such as audio output applications for locally reproducing acoustic sound waves from received RF audio at a wireless audio receiver device (e.g., such as headphone system, hearing aid system with one or two ear pieces, loudspeaker system, etc.), etc. Host layer 220 also includes data to be used in advertisement profile or Generic Attribute Profile (GATT) 222, generic access profile (GAP) 229, attribute protocol (ATT) 224, security manager (SM) 226 and logical link control and adaptation protocol (L2CAP) 228. Together GATT 222 and ATT 224 provide services 225 for Bluetooth smart module 200 that define an interface with other BLE devices connected to Bluetooth smart module 200 for reading and/or writing data for applications 212.

Figure 3:
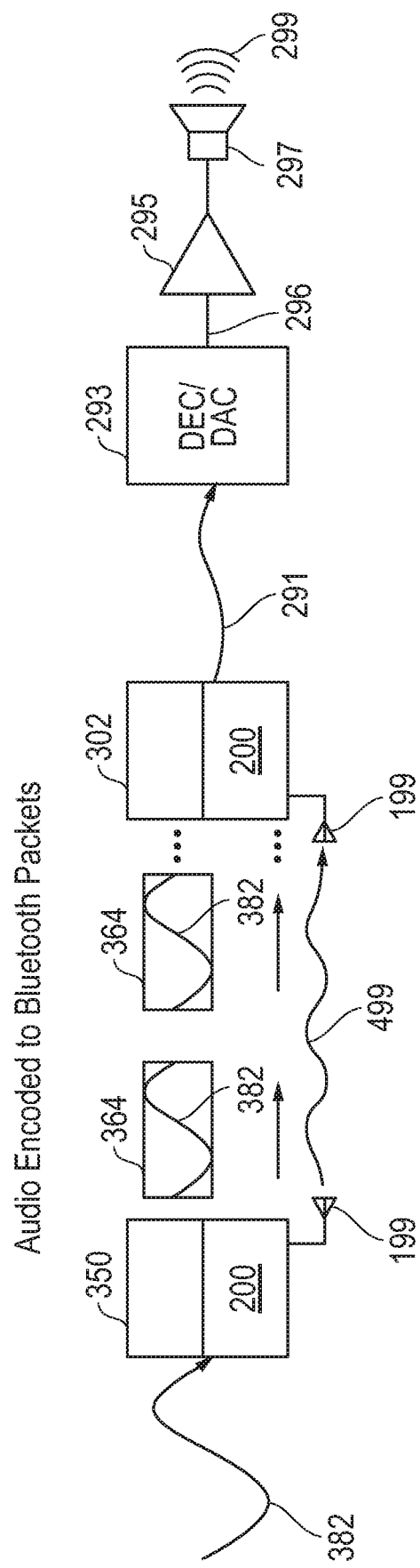
FIG. 3 illustrates a radio frequency (RF) signal data transmission conveying an audio data transmission according to one exemplary embodiment of the disclosed systems and methods.

In one embodiment such as illustrated in FIG. 3, application layer 210 of FIG. 2 may be capable of generating single or multiple channel audio data (e.g., from digital audio file, from streaming audio channels received across a network connection such as the Internet, from digitized audio input to a local microphone, etc.), and providing the single or multiple channel audio data to host layer 220 for transmission using Bluetooth (or BLE) controller 230 from Bluetooth smart module 200 of a BLE-enabled wireless transmitter device 350 as packets 364 via a RF signal 499 to one or more other BLE-enabled wireless receiver devices 302 across one or more BLE connections. It will be understood that a wireless transmitter device 350 may include any device that includes transmitter or transceiver circuitry configured to transmit a RF signal 499 in the manner described herein.

In another embodiment, application layer 210 of Bluetooth smart module 200 may be capable of receiving single or multiple channel audio data through host layer 220 and BLE controller 230 at a BLE-enabled wireless receiver device 302 as packets 364 via a RF signal 499 from a BLE-enabled wireless transmitter device 350 across a BLE connection. In the latter case, received audio data modification logic 275 may be present within a wireless receiver device 302 to modify information of the received audio channel data for analog acoustic audio reproduction based on one or more signal reception and/or transmission characteristic of the received RF signal 499, e.g., by varying the volume (or gain), tone, equalization and/or pitch of the audio sound waves that are acoustically reproduced from the audio data information. In one embodiment, received audio data information may be modified to individually vary the volume of the sound waves that are acoustically reproduced from the audio data information simultaneously at different respective speakers, for example, to vary the audio balance between left and right hearing aid speakers or left and right headphone speakers worn in or over the left and right ears of an individual, etc.

Referring now in more detail to FIG. 3, a radio frequency (RF) signal data transmission 499 (e.g., such as transmission of a Bluetooth Low Energy "BLE" connection) is shown carrying, containing or otherwise conveying an audio data transmission 382 (e.g., a digitized and encoded analog audio data transmission). More particularly, in FIG. 3 wireless transmitter device 350 is shown receiving audio data 382 of a digitized analog audio signal (e.g., as supplied from non-volatile memory, supplied from streaming network source such as Internet, supplied from audio synthesis circuitry (e.g., alert sound), supplied from microphone such as door intercom microphone, etc.). As shown, wireless transmitter device 350 in turn conveys the digitized audio data 382 within data packets 364 transmitted from wireless transmitter device 350 via a single antenna element 199 using RF signal 499. In the exemplary embodiment of FIG. 3, wireless receiver device 302 receives RF signal 499 with its audio data 382 at a single antenna element 199, measures received signal strength of signal 499, and then determines distance (e.g., absolute or relative distance) to wireless transmitter device 350 based on the measured received signal strength. Based on this distance determined from received signal strength, wireless receiver device 302 extracts and adjusts or modifies the amplitude of the audio data transferred by packets 364 (e.g., by using this distance determined from received signal strength to obtain a gain value which is in turn used modify audio data 382 to produce modified audio data 291 as shown). The modified audio data 382 is then provided to audio decoder (DEC) or digital-to-analog converter (DAC) 293 for conversion and acoustic reproduction as described further below. This is in contrast to the conventional case in which the wireless receiver device extracts, decodes and reproduces acoustic sound waves from the same (unmodified) audio data transmission transmitted by an audio transmitter device. It will be understood that the waveforms of data 382 and 291 in FIG. 3 each represents a digitized waveform.

Table 1 contains an example of a predetermined relationship (e.g., a lookup table stored in non-volatile memory or any other suitable stored predetermined relationship) between measured received RF signal strength and audio data amplitude modifier expressed as a gain multiplier that is multiplied by the audio data amplitude to modify the audio data amplitude. In this regard, both audio acoustic soundwaves and radio signals vary with distance according to an inverse square law such as described further herein. In one embodiment, the relationship between measured received RF signal strength and audio data amplitude in an air transmission medium environment may be expressed as a rule of thumb in which each −6 dBm decrease in signal strength corresponds to a doubling in distance between receiver device and transmitter device as illustrated by the values of Table 1.

TABLE 1

| Measured Received Signal Strength, dBm | Determined Distance to Wireless Transmitter Device | Audio Data Gain (Multiplier) |
| --- | --- | --- |
| −50 | 1 meter | 1 |
| −56 | 2 meters | 0.5 |
| −62 | 4 meters | 0.2 |
| ... | ... | ... |
| −80 | 32 meters | 0.03 |

It will be understood that the number of entries and particular gain values of Table 1 are exemplary only, and typically are application dependent. Further it will be understood that modification of audio data gain may be based directly on values of measured signal strength without optional determination of distance to wireless transmitter device, e.g., data of Table 1 may be alternately expressed as only two columns, measured received signal strength and corresponding audio gain multiplier. In another alternative embodiment, an inverse square equation such as described below may be implemented to convert distance determined from dBm signal strength to attenuation, e.g., rather than using lookup table values. Moreover, it will be understood that modification of audio data information may be based on other and/or additional measured signal transmission or reception characteristics such as described elsewhere herein. In this regard, the single antenna elements 199 of either or both of wireless devices 350 and 302 of FIG. 3 may be replaced with an antenna array 197 having multiple antenna elements 199 (as shown in FIGS. 1 and 2) in which case other signal transmission and/or reception characteristics may be measured, e.g., such as TDOA, AoA, AoD etc.

In other embodiments, modification of audio data gain may be performed to simulate acoustic attenuation that occurs when acoustic audio sound waves travel from one point to another (e.g., from point A to point B), since when audio data is conventionally conveyed by a RF signal transmitted from a wireless transmitter device to a wireless receiver device (e.g., as a Bluetooth or BLE transmission) no attenuation to the reproduced acoustic soundwaves occurs no matter the distance between A and B. In such embodiments, this acoustic attenuation maybe added artificially to the acoustic sound waves reproduced by speakers of a wireless receiver device.

In one embodiment, this acoustic sound wave attenuation may be modeled (e.g., calculated or otherwise determined) by a wireless receiver device based on a determined distance from the wireless receiver device to a wireless transmitter device that is transmitting a RF signal conveying audio data to the wireless receiver device. The determined attenuation (a) may then be used to attenuate the gain of reproduced acoustic sound waves produced by the wireless receiver device from the received audio data to simulate the acoustic attenuation (a) of these sound waves that would occur over a distance through air between the position of the wireless transmitter device and the position of the wireless receiver device per the following relationship: Modified gain of reproduced acoustic sound waves=(Unmodified gain of reproduced sound waves)×(attenuation, α).

In one exemplary embodiment, the amount of attenuation (a) applied by the wireless receiver device to the reproduced acoustic sound waves may be calculated by an inverse-square law ($1/r^2$) relationship as follows:

$$\alpha = 1/r^2$$

where: r is the distance between the wireless transmitter and wireless receiver (e.g., in meters (m)); and α is attenuation (in $m^{-1}$) or sound decreases by 1/e for each meter traveled.

It will be understood that the amount of attenuation (a) applied by the wireless receiver device to the reproduced acoustic sound waves may be calculated using any other relationship suitable for approximating actual sound wave attenuation over the distance between a wireless transmitter device and a wireless receiver device for a designated fluid such as an air transmission environment or a water transmission environment (e.g., for an underwater environment), e.g., such as Stokes' law of sound attenuation below:

$$\alpha = 2\eta\omega^2/3\rho V^3$$

where: η is the dynamic viscosity coefficient of the fluid (e.g., air water, etc.);

ω is the angular frequency of the sound

ρ is the density of the fluid (e.g., air, water, etc.)

V is the speed of sound in the medium (e.g., air water, etc.).

In the embodiment of FIG. 2, received audio data modification logic 275 may be executed separate from application layer 212 as shown, or may alternatively be executed by application layer 212 or using any other suitable data processing configuration. As described further herein, modified audio output channel data 291 may be provided to non-radio circuitry and/or non-radio hardware 265A that includes an audio decoder (DEC) or digital-to-analog converter (DAC) 293 where it is converted to one or more analog audio output signals $294_1$ to $294_N$ (depending on the application), amplified by amplifier circuitry 295, and provided as one or more separate amplified audio output channels $296_1$ to $296_N$ to one or more respective speakers $297_1$ to $297_N$ that may be integrated or otherwise co-located with the first BLE-enabled wireless device.

In addition to (or as an alternative to) audio generation or reproduction capability, application layer 210 of FIG. 2 may be configured to perform other tasks or functions, and configure operating mode of same. For example, application layer 210 capable of reading sensor data (e.g., from heart rate sensor, proximity sensor, temperature sensor, etc.), and reporting the data to host layer 220 for transmission using Bluetooth (or BLE) controller 230 from Bluetooth smart module 200 to one or more other receiving BLE-enabled devices across one or more connections.

In another embodiment, application layer 210 of Bluetooth smart module 200 may be additionally or alternatively capable of exchanging (receiving or transmitting) data, control and/or configuration information through host layer 220 and BLE controller 230 with other BLE-enabled devices across one or more connections. In such other configurations, received audio data modification logic 275 may be present to configure the operating mode of any one or more other such functions or tasks based on relative position of a transmitting BLE-enabled wireless device to a receiving BLE-enabled wireless device, e.g., such as described in U.S. patent application Ser. No. 16/145,592 entitled "SYSTEMS AND METHODS FOR SELECTING OPERATING MODE BASED ON RELATIVE POSITION OF WIRELESS DEVICES" by Jere M. Knaappila, which is filed concurrently herewith on the same day as the present patent application, and which is incorporated herein by reference in its entirety for all purposes.

As further shown in FIG. 2, Bluetooth (or BLE) controller 230 also includes link layer 232, baseband 234, and physical layer 236 (i.e., physical radio, radio frequency RF). Link layer 232 is present to provide ultra-low power idle mode operation and device (i.e., connection mode and advertising mode handling). Link layer 232 is also configured to control packet transmission and response. Link layer 232 may be configured to support one or more connections or may in one embodiment be configured with multiple virtual link layers that are simultaneously operating, and a scheduler that is configured to control access of the virtual link layers to common radio resources of physical layer 236 through baseband 234 in a manner described in United States Patent Application Publication Number 20180049106, which is incorporated herein by reference in its entirety for all purposes.

In one exemplary embodiment, processing components of second module 120 of FIG. 1 may implement demodulator or receiver component of baseband processor 234 of FIG. 2, and to sample a received signal. Processing components of first module 110 may be programmed to execute an application or other suitable programmed logic to perform received audio data modification logic 275 of FIG. 2 using sampled information provided by processing components of first module 110. In this regard, received audio data modification logic 275 may be executed to measure and/or process one or more signal reception and/or transmission characteristics of network signals received by BLE module 100 of FIG. 1 from one or more other BLE devices. Such signal reception and/or transmission characteristics may include any characteristic of a signal received at a given BLE module 100 that is indicative of a direction from which the signal is received at BLE module 100 and/or that is indicative of a spatial location of a device that transmitted the received signal to BLE module 100. Specific examples of such signal reception and/or transmission characteristics but are not limited to, time difference of arrival (TDOA), Angle of Arrival (AoA), Angle of Departure (AoD), etc. Further information on such signal reception and/or transmission characteristics, and examples thereof, may be found in United States Patent Application Publication Number 20180176776, in U.S. patent application Ser. No. 15/664,539 filed Jul. 31, 2017, and in U.S. Patent application Ser. No. 15/663,326 filed Jul. 28, 2017, each of which is incorporated herein by reference in its entirety for all purposes.

For example, TDOA and/or AoA of a received signal may be determined by TDOA/AoA determination logic 285 using any suitable technique, e.g., such as by using time difference of arrival (TDOA) techniques to measure the delay and/or or by measuring difference in received phase, of the received signal at each antenna element $199_1$ to $199_N$ in the antenna array 197 relative to another antenna element/s 199 in the antenna array 197 and which may include, for example, using switch 195 of FIG. 1 to switch through the different elements 199 of the array. At least a portion of such a received signal may be constant frequency to aid measurement of phase shift or TDOA between antenna elements of the array. In some embodiments direction of arrival (DOA) processing techniques such as MUltiple Signal Classification (MUSIC), Estimation of Signal Parameters Via Rotational Invariance Techniques (ESPRIT), etc. may be employed depending on the particular system configuration. It will be understood that in one embodiment, phase shift of a received signal may be performed by demodulator or receiver of baseband processor 234, and this determined phase shift information then passed upwards to a higher layer of BLE module 100 for AoA determination. In one embodiment, TDOA/AoA determination logic 285 may also be programmed to determine AoD or other signal transmission characteristics, or TDOA/AoA determination logic 285 may be replaced by suitable logic that only determines TDOA, AoD or other signal transmission characteristic/s. In another alternate embodiment, TDOA, AoA, and/or AoD may be determined by CPU 150 of first module 110 of FIG. 1, e.g., as an application/s executing in application layer 200 of FIG. 2.

It will be understood that functionality of received audio data modification logic 275 may be executed by one or more processing devices of BLE module 100, e.g., such as using one or more processing device/s of first module 110, one or more processing device/s of second module 120, and/or combinations of processing device/s of first module 110 and second module 120.

Figure 4:
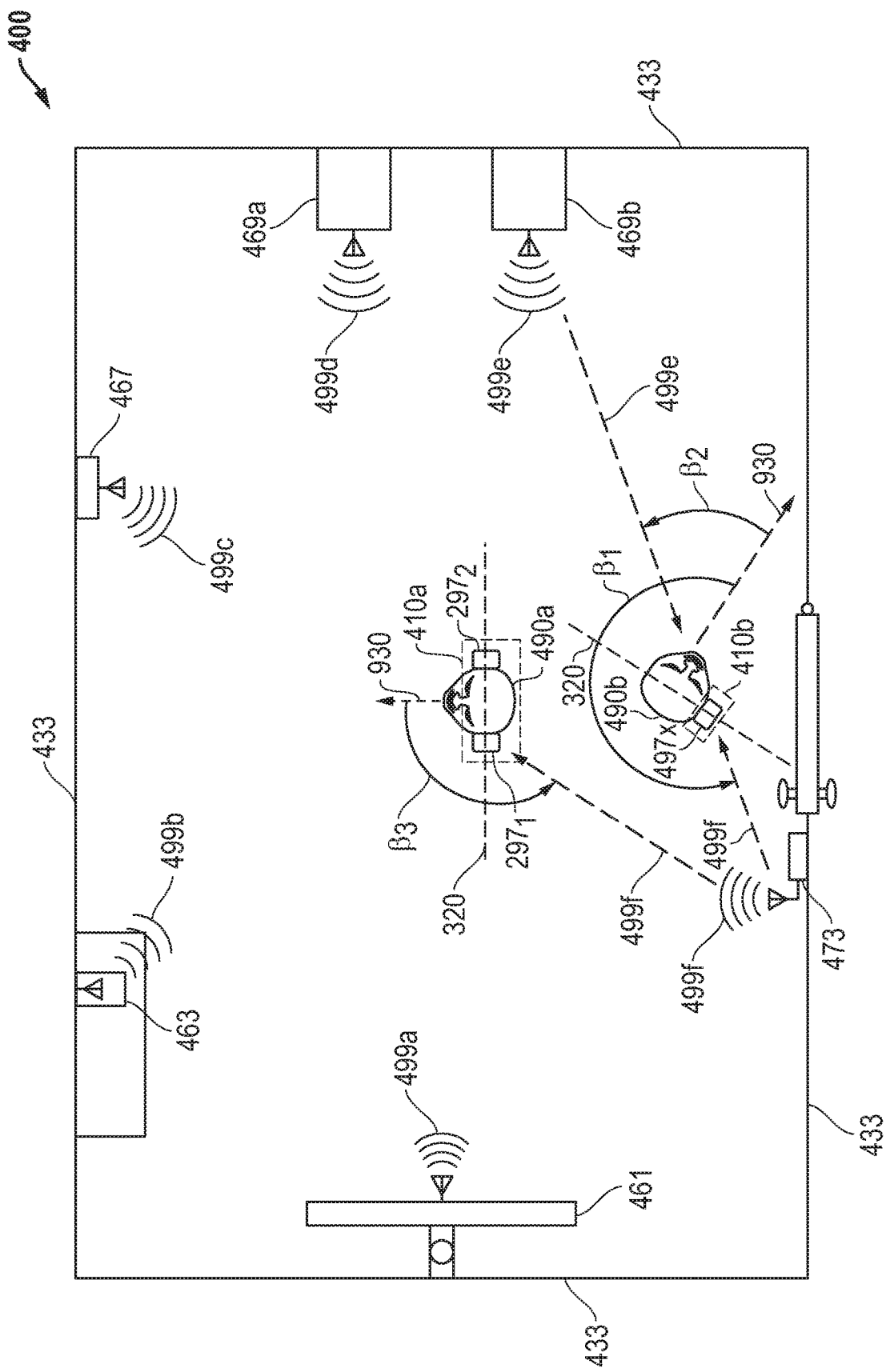
FIG. 4 illustrates an overhead view of a wireless audio data environment according to one exemplary embodiment of the disclosed systems and methods.

FIG. 4 illustrates an overhead view of one exemplary embodiment of an indoor wireless audio data environment 400, e.g., such as may be enclosed within walls 402 of a room. In this embodiment, a first human user 490a is wearing a portable wireless audio data receiver system 410a (e.g., a battery powered wireless headphone system, battery powered dual ear hearing aid system, etc.) that includes a first speaker $297_1$ worn adjacent the user's left ear and a second speaker $297_2$ worn adjacent the user's right ear. Also shown present within indoor audio data environment 400 is a second human user 490b who is wearing a portable wireless audio data receiver system 410b (e.g., a battery powered hearing aid system, a battery powered monaural ear piece, etc.) that includes only a single speaker $297_X$ worn adjacent the user's user's right ear. Although not illustrated in FIG. 4, each of wireless audio data receiver systems 410a and 410b also includes at least one antenna array having two or more antenna elements, e.g., such as illustrated and described further in relation to FIGS. 7A, 7B and 7C herein. In this regard, an antenna array having two or more antenna elements 199 may be employed to determine signal direction relative to a single axis (e.g., such as left/right of a user relative to reference vector 930 or front/back of a user relative to an array center plane 320), while an antenna array having three or more antenna elements not arranged relative to each other in a single line may be employed to determine signal direction angle (e.g., signal direction angle through a full 180 degree or other range of possible angles relative to a given axis such as described further herein in relation to Table 2).

As described elsewhere herein, each of systems 410a and 410b may be configured to modify audio information of each given one of audio data RF signal transmissions 499a-499f received from a corresponding one of wireless audio data transmitter devices (e.g., television 461, smart phone 463, smoke alarm 467, left stereo loudspeaker 469a, right stereo loudspeaker 469b, and door intercom 473) based on one or more signal reception and/or transmission characteristics of the given audio data transmission 499. Examples of wireless receiver systems 410 are found described further herein in relation to FIGS. 7A-7C.

More particularly, first and second speakers $297_1$ and $297_2$ of system 410a may be operated to acoustically reproduce modified audio data conveyed by a given one of received RF signals 499 as analog acoustic sound waves that are heard by the left and right ears of a first human user 490a, e.g., in a manner that indicates distance, direction, and/or spatial position of the transmitting source (i.e., wireless transmitter device) of the given received RF signal 499 relative to the wireless receiver system 410a. Also in the embodiment of FIG. 4, single speaker $297_X$ of system 410b may be operated to acoustically reproduce modified audio data derived from a given one of received RF signals 499 as acoustic analog sound waves that are heard by only one ear (in this case the right ear) of a second human user 490b, e.g., also in a manner that indicates distance, direction, and/or spatial position of the transmitting source of the given received RF signal 499 relative to the wireless receiver system 410b.

As an example, in the embodiment of FIG. 4, system 410b may be operated to cause single speaker $297_X$ to modify and acoustically reproduce modified audio data derived from a given one of received RF signals 499 as analog sound waves that are heard by only the right ear of user 490b. Examples of modifications that may be performed for acoustic reproduction by single speaker $297_X$ includes varying the audio data gain (and therefore the volume of the acoustically reproduced audio) based on the measured received signal strength of the given RF signal 499, e.g., such as described above in relation to Table 1. In such an embodiment, the real time relative distance to a wireless transmitter device source of the given RF signal 499 may be indicated to user 490b by the relative volume of the sound waves acoustically reproduced by speaker $297_X$.

Thus, as an example, the gain of reproduced acoustic sound played at single speaker $297_X$ from audio data conveyed by RF signals 499e and 499f may be modified by system 410b according to the corresponding real time measured signal strength of received RF signals 499e and 499f from respective transmitters of loudspeaker device 469b and door intercom device 473, e.g., acoustic sound from audio data of RF signal 499e may be reproduced with a lower gain than the acoustic sound reproduced from audio data of RF signal 499f since loudspeaker device 469b is currently positioned further away from human user 490b than is door intercom device 473 (resulting in RF signal 499e being weaker than RF signal 499*f*) in a manner such as dictated by gain specifications of Table 1.

Other examples of modifications that may be performed for acoustic reproduction by single speaker such as single speaker 297$_X$ of system 410*b* include, but are not limited to, modifying the audio data by adjusting the pitch of the reproduced audio data according to the determined real time direction relative to a frontal reference vector 930 of system 410*b* (and therefore which side of human user 490*b*) from which a given RF signal 499 is being received or transmitted. For example, in FIG. 4 the pitch of acoustic sound reproduced from transmitted audio data conveyed by RF signal 499*f* may be modified lower since RF signal 499*f* is received from a door intercom device 473 that is currently positioned to the right side of a frontal reference vector 930 of the human user 490*b* as indicated by measured angle of arrival (AoA) β$_1$ from which signal 499*f* is received, while the pitch of acoustic sound reproduced from transmitted audio data conveyed by RF signal 499*e* may be modified higher since RF signal 499*e* is received from loudspeaker device 469*b* that is currently positioned to the left side of human user 490*b* as indicated by measured angle of arrival (AoA) β$_2$ from which signal 499*e* is received.

In yet another embodiment, audio data information may be modified by adding synthesized speech information to the audio data according to described position and/or direction from which a given RF signal 499 is being received or transmitted. For example, in FIG. 4, speech synthesis may be used to add synthesized human language to the acoustic sound reproduced from transmitted audio data conveyed by RF signal 499*f* to describe to the human user 490*b* that the source door intercom device 473 is currently positioned to the right side of a frontal reference vector 930 of the human user 490*b* as indicated by measured angle of arrival (AoA) β$_1$ from which signal 499*f* is received, while speech synthesis may be used to add synthesized human language to the acoustic sound reproduced from transmitted audio data conveyed by RF signal 499*e* to describe to the human user 490*b* that the source loudspeaker device 469*b* is currently positioned to the left side of human user 490*b* as indicated by measured angle of arrival (AoA) β$_2$ from which signal 499*e* is received. Any suitable speech synthesis algorithm may be employed, such as Text to Speech (TTS) algorithm/s.

It will be understood that combinations of different types of audio data modifications may also be performed at the same time, e.g., in the case of FIG. 4 both the above-described pitch modification (based on measured AoA, AoD, and/or TDOA of a received signal RF 499) and gain modification (based on measured received signal strength of the same received RF signal 499) may be simultaneously implemented together when reproducing acoustic sound from audio data of received signals 499*e* and 499*f*. Additional information on techniques for measuring angle of arrival (AoA) β of a RF signal relative to a vector may be found, for example, in U.S. patent application ser. no. 16/145,592 entitled "SYSTEMS AND METHODS FOR SELECTING OPERATING MODE BASED ON RELATIVE POSITION OF WIRELESS DEVICES" by Jere M. Knaappila, which is filed concurrently herewith on the same day as the present patent application, and which is incorporated herein by reference in its entirety for all purposes. It will also be understood that any other type of measurement that is suitable for indicating direction and/or side of arrival relative to a frontal reference vector 930 and/or array center plane 320 may be alternatively employed, e.g., such as side of arrival measurements described in U.S. patent application ser. no. 16/145,592 entitled "SYSTEMS AND METHODS FOR SELECTING OPERATING MODE BASED ON RELATIVE POSITION OF WIRELESS DEVICES" by Jere M. Knaappila, which is filed concurrently herewith on the same day as the present patent application, and which is incorporated herein by reference in its entirety for all purposes.

While the above-described embodiments may be advantageously implemented by a single-speaker monaural wireless receiver device such as described above, it will be understood that similar or additional types of audio data modification/s may also be performed by a dual-speaker wireless receiver, such as receiver system 410*a* of FIG. 4. In this regard, the same modified audio data may be acoustically reproduced at each of speakers 297$_1$ and 297$_2$ when speakers 297$_1$ and 297$_2$ of dual-speaker portable wireless audio receiver system 410*a* are operated in a monaural mode to reproduce the same acoustic sound waves at each of speakers 297$_1$ and 297$_2$. However, in the case of such a dual-speaker receiver device 410*a*, information of audio data from a received RF signal 499 may be modified differently for analog acoustic sound reproduction at left speaker 297$_1$ than at right speaker 297$_2$ so as to indicate real time distance, direction, and/or spatial position of the transmitting device (e.g., one of devices 461, 463, 467, 469*a*, 469*b*, 473, etc.) relative to the receiver device 410*a*.

For example, in the embodiment of FIG. 4, portable wireless audio receiver system 410*a* is shown receiving an RF signal 499*f* that is conveying audio data from door intercom device 473. In this case, system 410*a* may be configured to measure the received angle of arrival (AoA) β$_3$ (and therefore which side of human user 490*a*) from which RF signal 499*f* is received by system 410*a* as shown. In this regard, angle of arrival (AoA) β$_3$ (or alternatively side of arrival) may be measured relative to frontal reference vector 930 and/or array center plane 320 of system 410*a* as described elsewhere herein and in U.S. patent application Ser. No. 16/145,592 entitled "SYSTEMS AND METHODS FOR SELECTING OPERATING MODE BASED ON RELATIVE POSITION OF WIRELESS DEVICES" by Jere M. Knaappila, which is filed concurrently herewith on the same day as the present patent application, and which is incorporated herein by reference in its entirety for all purposes. However measured, system 410*a* may acoustically reproduce modified audio data derived from RF signal 499*f* as sound waves having a higher volume or gain at speaker 297$_1$ than at speaker 297$_2$ so as to match the measured angle of arrival (AoA) relative to reference vector 930 from which the RF signal 499*f* is received at system 410*a*, i.e., with adjusted louder left channel volume than right channel volume to indicate to user 490*a* that RF signal 499*f* is being received from the left side of user 490*a*.

In one exemplary embodiment, the modified audio data may be produced at the system 410*a* by individually varying the volume information of respective audio data channels reproduced at speakers 297$_1$ and 297$_2$ so as to vary the audio balance between the reproduced analog audio acoustic sound waves of the speakers 297$_1$ and 297$_2$ to produce an indicated audio point of origin that corresponds to the determined direction from which the signal 499*f* is received from the door intercom device 473 at system 410*a*.

As indicated by Table 2 below in reference to counter-clockwise angle measurement of FIG. 4, audio data information from a received RF signal 499 may be adjusted to vary gain of acoustic signals reproduced at left and right speakers 297$_1$ and 297$_2$ in real time based on changes in measured angle of arrival (AoA) β relative to a direction of a frontal reference vector 930. It will be understood that the information in Table 2 is exemplary only, and that the direction of AoA measurement (clockwise or counter-clockwise), and/or number and value of AoA ranges, may be varied as so desired. In the embodiment of Table 2, acoustic sound from a received RF signal 499 may be reproduced with a lower gain when received from a range of angles behind user 490a (e.g., 135°<AoA≤225°) than when received from a range of angles in front of user 490a (e.g., 0°≤AoA≤45° and 315°≤AoA≤360°).

TABLE 2

| Counterclockwise Measured Angle of Arrival (β) Range From Frontal Reference Vector, Degrees | Left Audio Data Gain (Multiplier) | Right Audio Data Gain (Multiplier) |
|---|---|---|
| 0° ≤ AoA ≤ 45° | 0.75 | 0.75 |
| 45° < AoA ≤ 135° | 1.0 | 0.25 |
| 135° < AoA ≤ 225° | 0.5 | 0.5 |
| 225° < AoA ≤ 315° | 0.25 | 1.0 |
| 315° < AoA < 360° | 0.75 | 0.75 |

As further indicated in Table 3, adjustment of the pitch of reproduced audio data from a received RF signal 499 may be optionally performed alone (or together with left/right gain adjustment) based on the front or back side of arrival of the RF signal 499 relative to an array center plane 320 so as to indicate to a user 490 whether or not the RF signal 499 is received from the front or back side of the user 490.

TABLE 3

| Measured Side of Arrival Relative to Array Center Plane | Left-Side Speaker Modified Reproduced Pitch of Audio Data | Right-Side Speaker Modified Reproduced Pitch of Audio Data |
|---|---|---|
| Front | Audio data pitch unmodified (0% modification) | Audio data pitch unmodified (0% modification) |
| Back | Audio data pitch modified lower (e.g., by −20%) | Audio data pitch modified lower (e.g., by −20%) |

It will be understood that Table 3 is exemplary only, and that the incremental pitch modification values of Table 3 (expressed as percentages) are exemplary only and may be varied as desired. Further it is also possible that pitch may be modified higher for measured front side RF signal arrival (rather than no modification). It will also be understood that in another embodiment no modification to pitch (or alternatively pitch modified higher) may be employed for a measured back side RF signal arrival while a pitch modified lower is employed for a measured front side RF signal arrival. In one embodiment, pitch of relatively lower frequency audio data may be modified less (e.g., by less percentage value lower or higher) than pitch of relatively higher frequency audio data.

Moreover, as previously indicated, a similar methodology may be employed to distinguish left from right side arrival of a RF signal 499, e.g., by not modifying or by raising the pitch of the acoustic data reproduced by the speaker on the same side of the user as RF signal arrival and lowering the pitch of the acoustic data reproduced by the speaker on the opposite side of the user from the RF signal arrival, or vice-versa. As previously indicated, example techniques for determining side of arrival are described, for example, in U.S. patent application ser. no. 16/145,592 entitled "SYSTEMS AND METHODS FOR SELECTING OPERATING MODE BASED ON RELATIVE POSITION OF WIRELESS DEVICES" by Jere M. Knaappila, which is filed concurrently herewith on the same day as the present patent application, and which is incorporated herein by reference in its entirety for all purposes.

Figure 5:
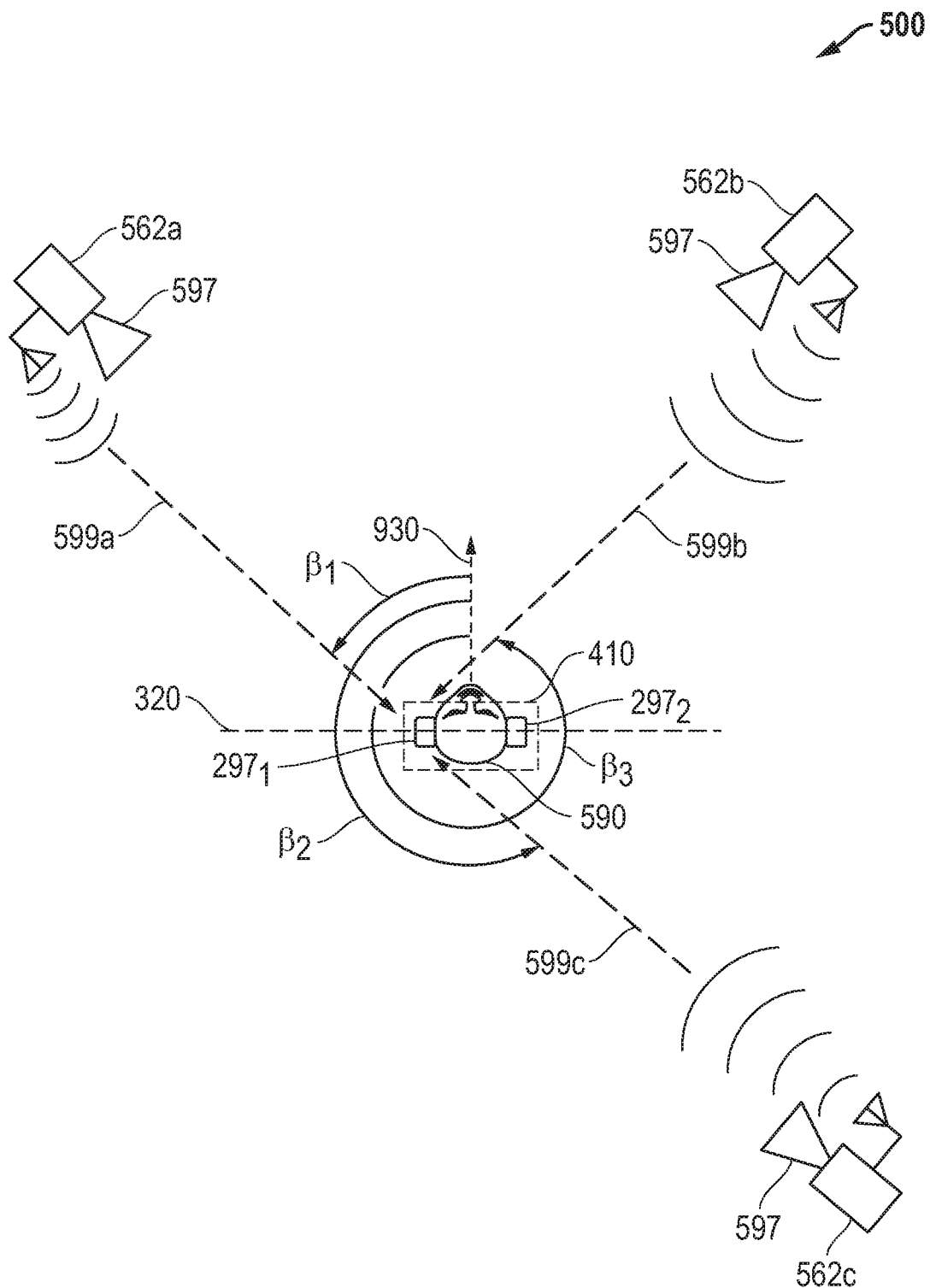
FIG. 5 illustrates an overhead view of a wireless audio data environment according to one exemplary embodiment of the disclosed systems and methods.

FIG. 5 illustrates an overhead view of one exemplary embodiment of a public address wireless audio data environment 500, e.g., such as may be enclosed indoors within a convention hall, or outdoors at an auto dealer, flea market, zoo, etc. In this embodiment, human user 590 is wearing a portable wireless audio data receiver system 410 having first and second speakers $297_1$ and $297_2$ worn adjacent the user's respective left and right ears as described in relation to the embodiment of FIG. 4. In this embodiment, multiple public address systems 562a, 562b and 562c act as audio data transmitter devices that each utilize a respective loudspeaker 597 to project an acoustic announcement which may describe items of interest occurring and/or positioned at the location of the given system 562, e.g., such as a sales booth, demonstration booth, live animal show, automobile or other product for sale, etc.

In the embodiment of FIG. 5, each of multiple public address systems 562a, 562b and 562c also broadcasts a RF signal that that may convey the same and/or different information as the acoustic announcement, but intended for hard of hearing persons or other persons who cannot otherwise hear the acoustic announcements such as persons wearing music or communication headsets. In the same manner as described for the embodiment of FIG. 4, system 410 of FIG. 5 may be configured to modify audio information of each given one of the audio data RF signal transmissions 599a-599c received from transmitters of the respective public address systems 562a-562c based on one or more signal reception and/or transmission characteristics of the corresponding audio data transmission 599a, 599b or 599c.

For example, the same modified audio data may be acoustically reproduced at each of speakers $297_1$ and $297_2$ when speakers $297_1$ and $297_2$ of dual-speaker portable wireless audio receiver system 410 of FIG. 5 are operated in a monaural mode to reproduce the same acoustic sound waves at each of speakers $297_1$ and $297_2$. Alternatively, payload information of audio data from a received RF signal 499 may be modified or modulated differently for analog acoustic sound reproduction at left speaker $297_1$ than at right speaker $297_2$ so as to indicate real time distance, direction, and/or spatial position of the transmitting public address devices relative to the receiver device 410 of FIG. 5. For example, system 410 may be configured to measure the side of arrival or to measure the received angle of arrival (AoA) $β_1$, $β_2$ and $β_3$ of respective RF signals 599a, 599c and 599b of FIG. 5 to determine direction where the RF signal transmission is coming, in the same manner as described for the embodiment of FIG. 4. Further, system 410 of FIG. 5 may acoustically reproduce modified audio data derived from each received RF signal 599 by adjusting the left/right channel volume balance between speakers $297_1$ and speakers $297_2$ based on this determined direction, e.g., as sound waves having a higher volume or gain at either of speaker $297_1$ or speaker $297_2$ so as to match the measured angle of arrival (AoA) relative to reference vector 930 from which each RF signal 599 of is received at system 410 of FIG. 5 in the same manner as described in relation to FIG. 4.

As with the embodiment of FIG. 4, no modification or a relatively high pitch modification may be employed for a measured back side RF signal arrival while a relatively low pitch modification may be employed for a measured front side RF signal arrival, or vice-versa. Moreover, a similar methodology may be employed to distinguish left from right side arrival of a RF signal 599, e.g., by not modifying or by raising the pitch of the acoustic data reproduced by the speaker on the same side of the user as RF signal arrival and lowering the pitch of the acoustic data reproduced by the speaker on the opposite side of the user from the RF signal arrival, or vice-versa.

Figure 6A:
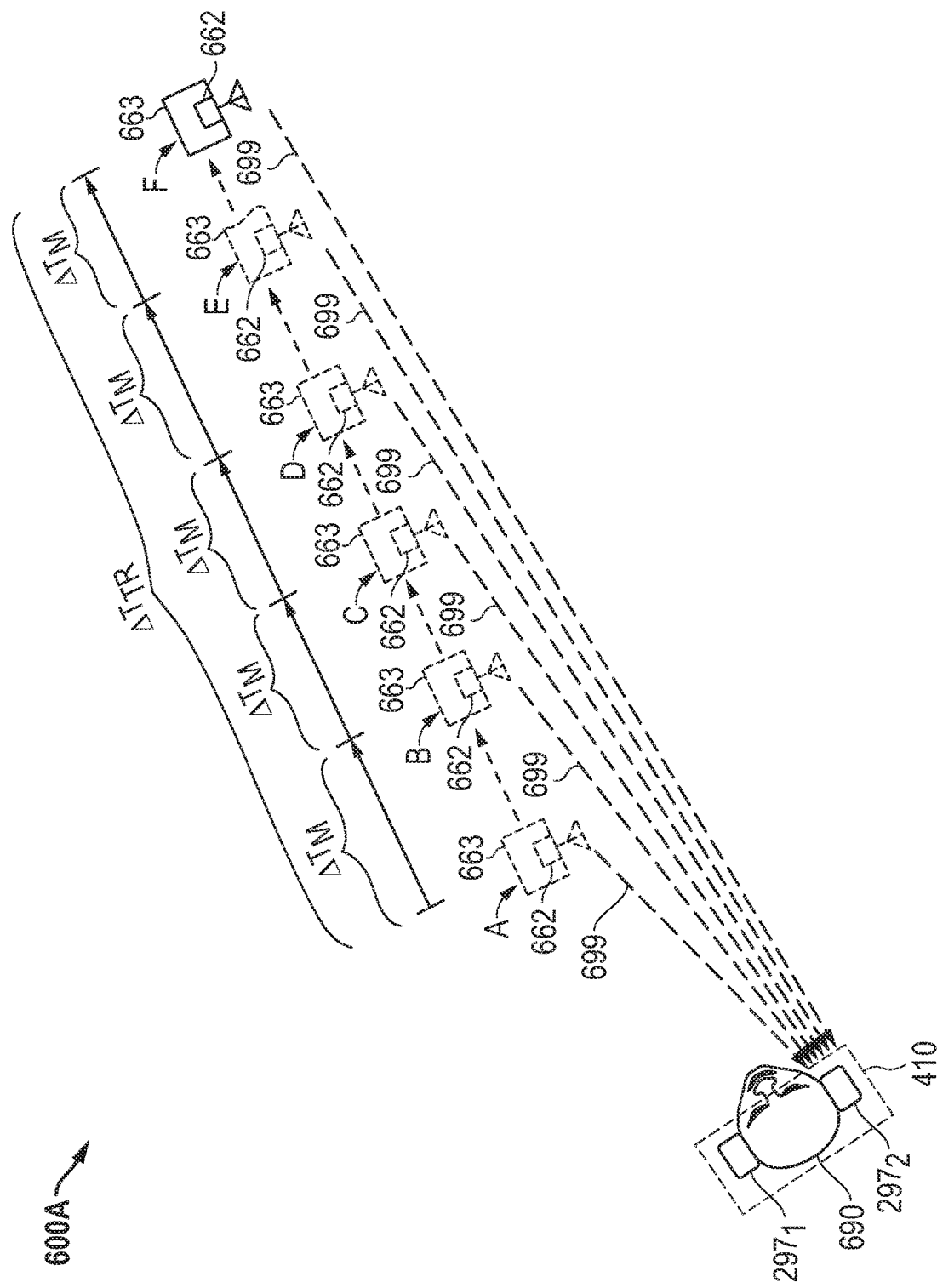
FIG. 6A illustrates an overhead view of a wireless audio data environment according to one exemplary embodiment of the disclosed systems and methods.

FIG. 6A illustrates an overhead view of one exemplary embodiment of dynamic wireless audio data environment 600A in which a mobile wireless audio data transmitter device 662 is moving relative to a human user 690 who is wearing a portable wireless audio data receiver system 410 having first and second speakers $297_1$ and $297_2$ worn adjacent the user's respective left and right ears as described in relation to the embodiments of FIGS. 4 and 5. However, it will be understood that the embodiment of FIGS. 6A and 6B may be similarly implemented using a wireless audio data receiver system having only a single speaker 297, or more than two speakers 297. In one embodiment, mobile transmitter device 662 may be a wireless transmitter device that is positioned on any type of movable platform 663, such as a moving vehicle (e.g., drone, robot, forklift, tractor, model car, model airplane, bicycle, motorcycle, full-size automobile or truck, full-size aircraft or helicopter, full-size boat or ship, etc.), moving (walking or running) human or animal, etc. Examples of environments in which such moveable platforms may be moving relative to user 690 include, but are not limited to, a race (vehicle, human or animal race, etc.) where user 690 is a human spectator, a city street or highway environment where user 690 is a pedestrian crossing or otherwise negotiating the street or highway, a factory environment where user 690 is a factory employee or supervisor working around moving drones, robots, forklifts, tractors, etc.

As shown in FIG. 6A, mobile wireless audio data transmitter device 662 broadcasts a RF signal 699 that conveys audio data (e.g., engine sound, alarm tone/s, music, etc.) intended for hard of hearing persons or other persons who cannot otherwise hear the acoustic sound of the movable platform 663, such as persons wearing music or communication headsets. Alternatively, the broadcast audio data may be provided for other reasons, such as in the case where the movable platform is otherwise acoustically silent while moving, or where the audio data includes information corresponding to a different acoustic sound than the actual sound of the movable platform 663 while it is moving.

In FIG. 6A, movable platform 663 is moving in the direction of the arrows away from human user 690, e.g., at a constant or varying speed. As shown, movable platform 663 moves from positon A to position F over a given period of travel time ($\Delta T_{TR}$) that depends on the speed with which movable platform 663 moves relative to user 690, e.g., $\Delta T_{TR}$ travel time from position A to position F may be 10 seconds, or any greater or lesser period of time, depending on the given speed of platform 663. During the movement of platform 663, wireless receiver system 610 may be configured to dynamically and repeatedly measure one or more signal reception and/or transmission characteristics of the received RF signal transmission 699 according to a measurement time interval ($\Delta T_M$) which in this embodiment is less than $\Delta T_{TR}$ (e.g., $\Delta T_M$=2 seconds and $\Delta T_{TR}$=10 seconds, although these time values are exemplary only and it is also possible that a continuous measurement of signal reception and/or transmission characteristics may be made). Different types of signal transmission and/or reception characteristics, and techniques for measuring these characteristics, may be the same as described elsewhere herein with regard to the embodiments of FIGS. 4 and 5.

Still referring to FIG. 6A, the relative position of platform 663 to user 690 changes from position A to position B during a first predefined period of elapsed time $\Delta T_M$, and likewise for each successive period of predefined time $\Delta T_M$ from positions B to F as shown, with measurement of signal transmission characteristics occurring at each position A, B, C, D, E and F. For example, wireless audio receiver system 410 may measure received signal strength of RF signal 699 as it is received at each position A, B, C, D, E and F, with measured received signal strength being successively lower at each position due to increasing distance of platform 663 from user 690 and wireless audio receiver system 410. Based upon a comparison between these changing received signal strength (or distance) measurements, wireless audio receiver system 410 may be configured to automatically modify information of the audio data in real time to adjust the pitch of the acoustic sound waves produced by the wireless device speakers $297_1$ and $297_2$ according to the rate of decreasing RF signal strength versus elapsed time so as to simulate a Doppler effect produced by a hypothetical acoustic sound wave source that is moving away from the wireless audio receiver system 410 in the same manner (e.g., direction and speed) as the moving platform 633, e.g., so as to allow user 690 listening to these reproduced acoustic sound waves to deduce relative speed and direction (away from user 690) of the moving platform 633. It will be understood that similar methodology may be employed when platform 633 is moving toward or past user 690. In this regard, information of the audio data may be modified in real time to adjust the pitch of the acoustic sound waves produced by the wireless device speakers $297_1$ and $297_2$ according to the rate of relative speed of movement between platform 633 and user 690, e.g., whether only one of platform 633 or user 690 is moving relative to the other, or each of platform 633 and user 690 are moving relative to each other. As with the embodiment of FIG. 4, pitch of relatively lower frequency audio data may be modified less (e.g., by less percentage value lower or higher) than pitch of relatively higher frequency audio data.

Figure 6B:
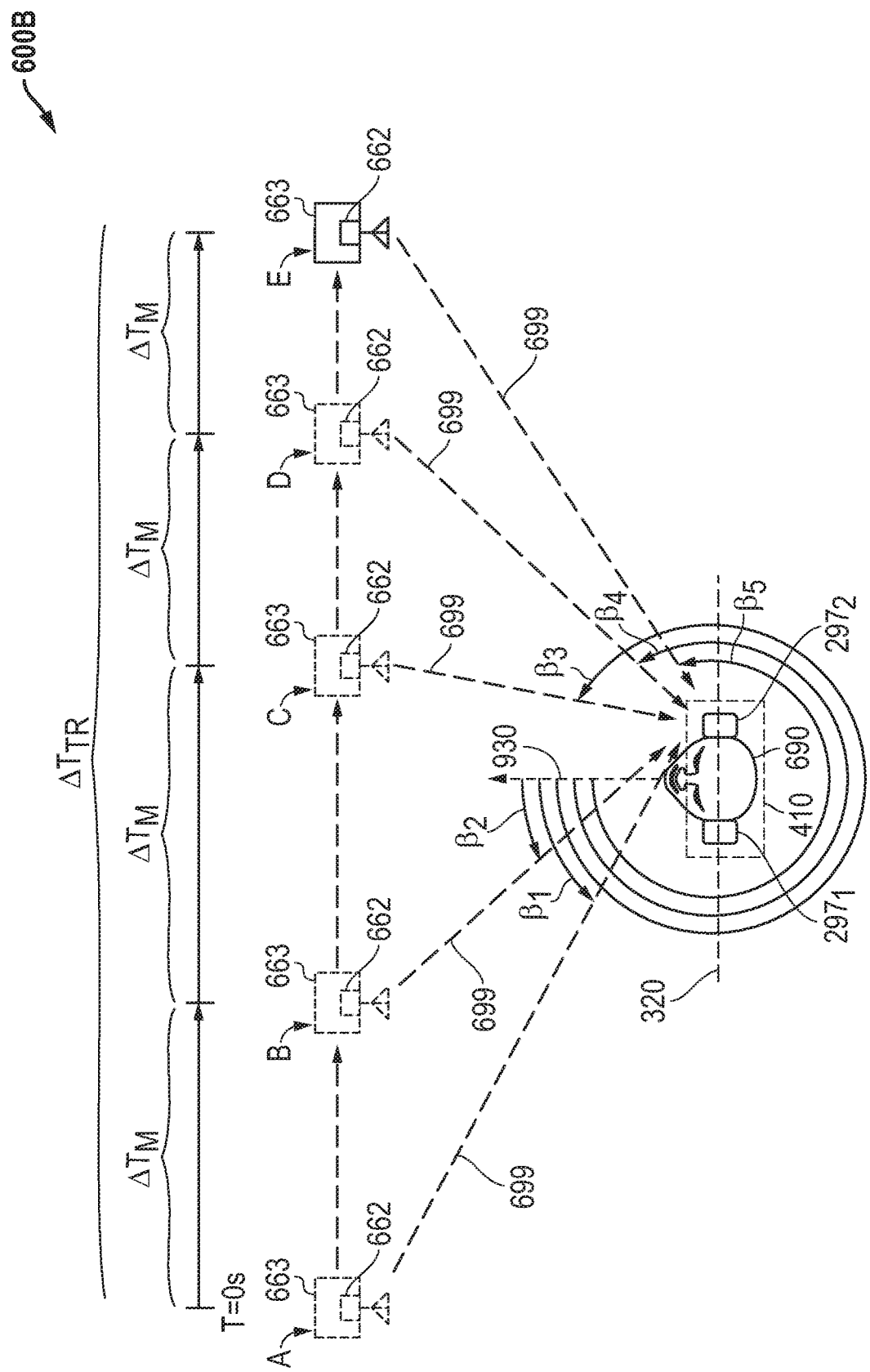
FIG. 6B illustrates an overhead view of a wireless audio data environment according to one exemplary embodiment of the disclosed systems and methods.

FIG. 6B illustrates another exemplary embodiment of a wireless audio data environment 600B in which movable platform 663 with audio data transmitter device 662 is moving from left to right in the direction of the arrow in front of and past a position of human user 690, e.g., at a constant or varying speed. Similar to the embodiment of FIG. 6A, movable platform 663 moves from positon A to position E from left side to right side of user 699 over a given period of travel time ($\Delta T_{TR}$) that depends on the speed with which movable platform 663 moves relative to user 690 depending on the given speed of platform 663. During the movement of platform 663, wireless audio data receiver system 610 may be configured to dynamically and repeatedly measure AoA of the received RF signal transmission 699 according to a predefined measurement time interval ($\Delta T_M$), e.g., $\Delta T_M$ may be 2.5 seconds and $\Delta T_{TR}$ may be 10 seconds, although other greater and lesser values of $\Delta T_M$ and corresponding $\Delta T_{TR}$, as well as continuous AoA measurement, are possible as needed or desired to fit a given implementation.

Still referring to FIG. 6B, AoA of received signal at system 410 is measured at each $\Delta T_M$ as the relative position of platform 663 to user 690 changes from position A to each successive position B to E, i.e., resulting in measured AoA values of $\beta_1$ at position A, $\beta_2$ at position B, of $\beta_3$ at position C, $\beta_4$ at position D, $\beta_5$ at position E, etc. Based upon these changing AoA measurements, wireless audio receiver system 410 may be configured to automatically modify information of the audio data in real time to adjust the pitch of the acoustic sound waves produced by the wireless device speakers $297_1$ and $297_2$ according to the rate of changing AoA versus elapsed time so as to simulate a Doppler effect produced by a hypothetical acoustic sound wave source that is moving toward and past the wireless audio receiver system 410 in the same manner (e.g., direction and speed) as the moving platform 633.

Figure 7A:
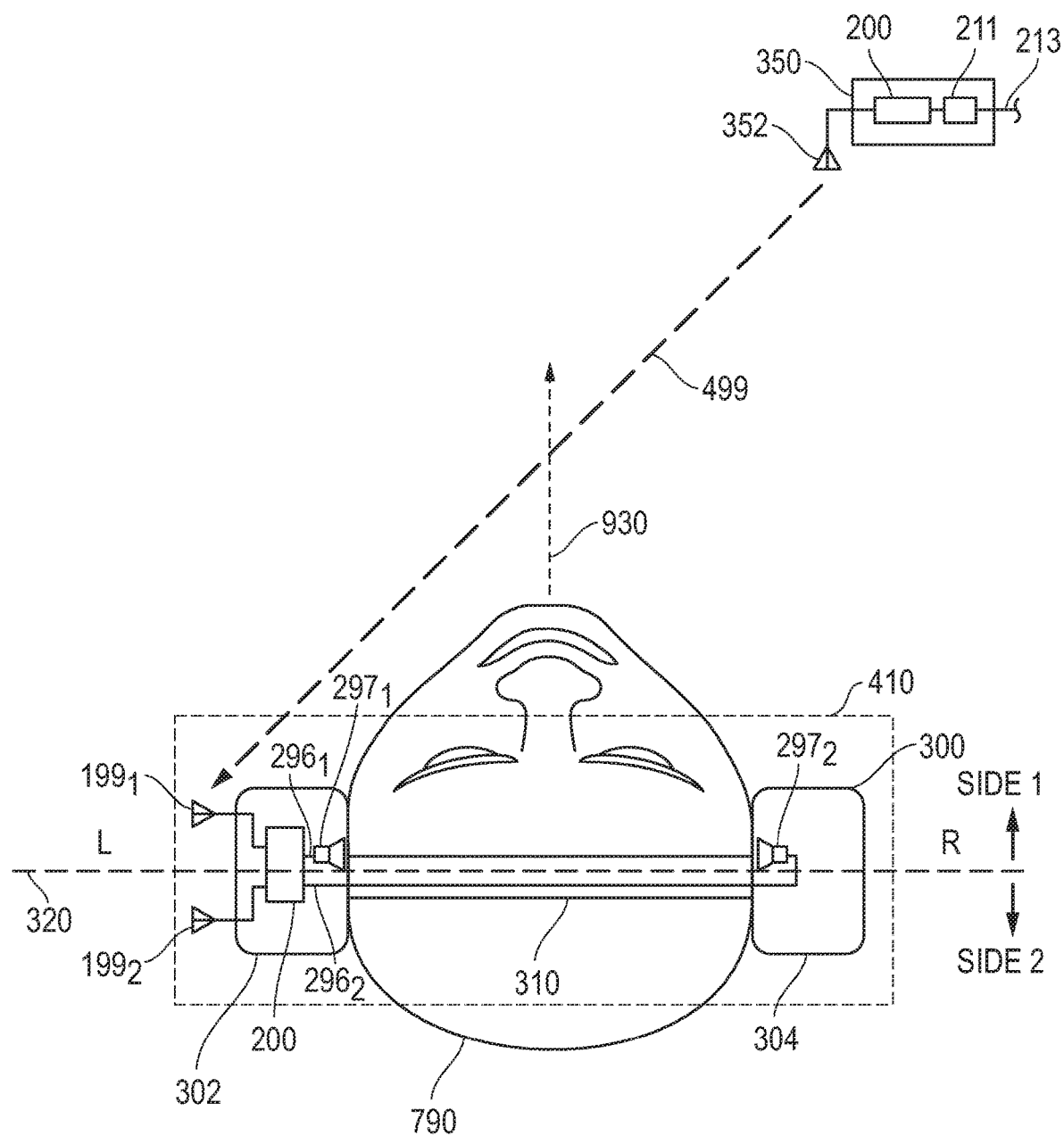
FIG. 7A illustrates an overhead view of a wireless audio receiver system receiving a RF signal from a wireless transmitter device according to one exemplary embodiment of the disclosed systems and methods.
Figure 7B:
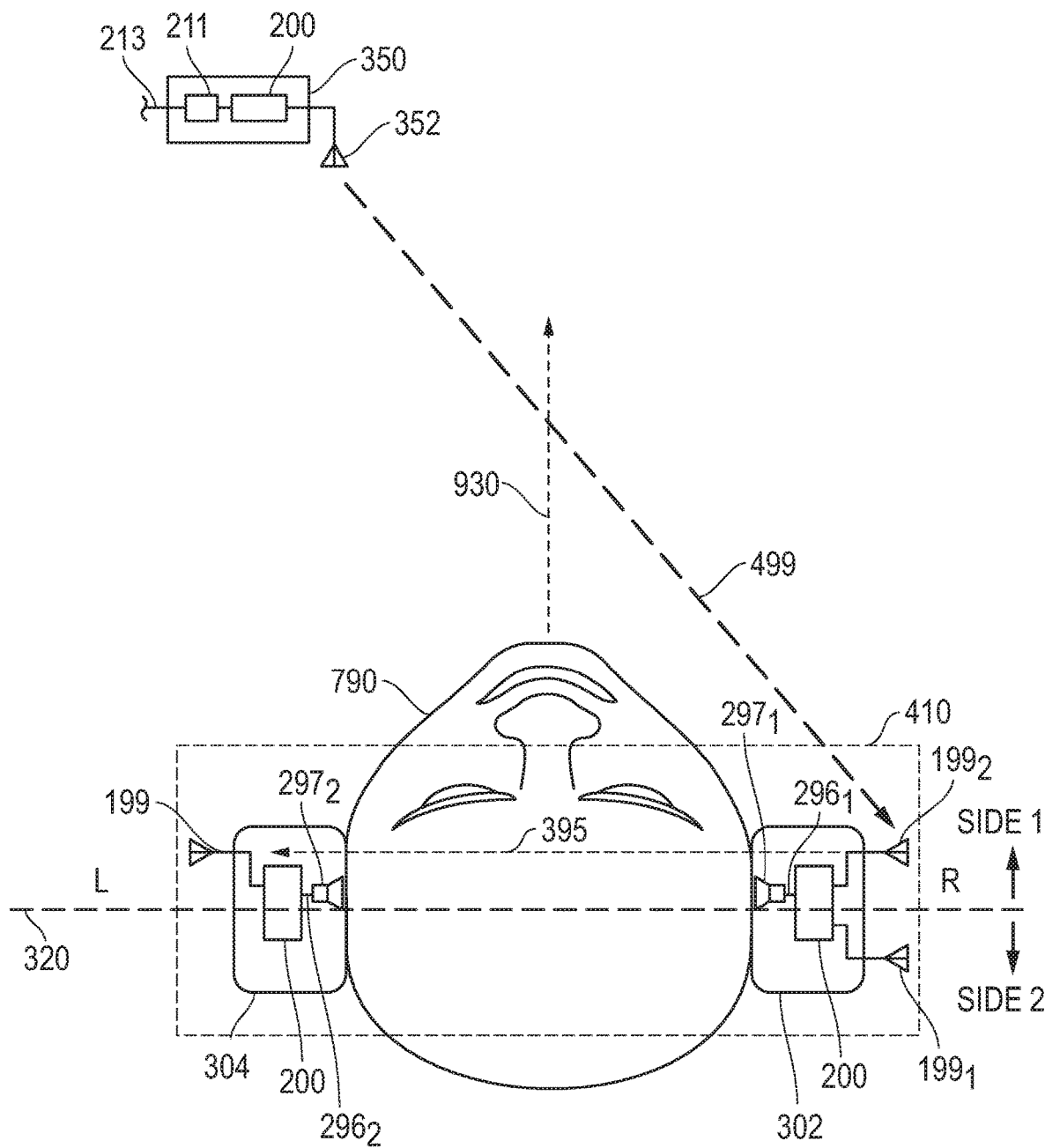
FIG. 7B illustrates an overhead view of a wireless audio receiver system receiving a RF signal from a wireless transmitter device according to one exemplary embodiment of the disclosed systems and methods.
Figure 7C:
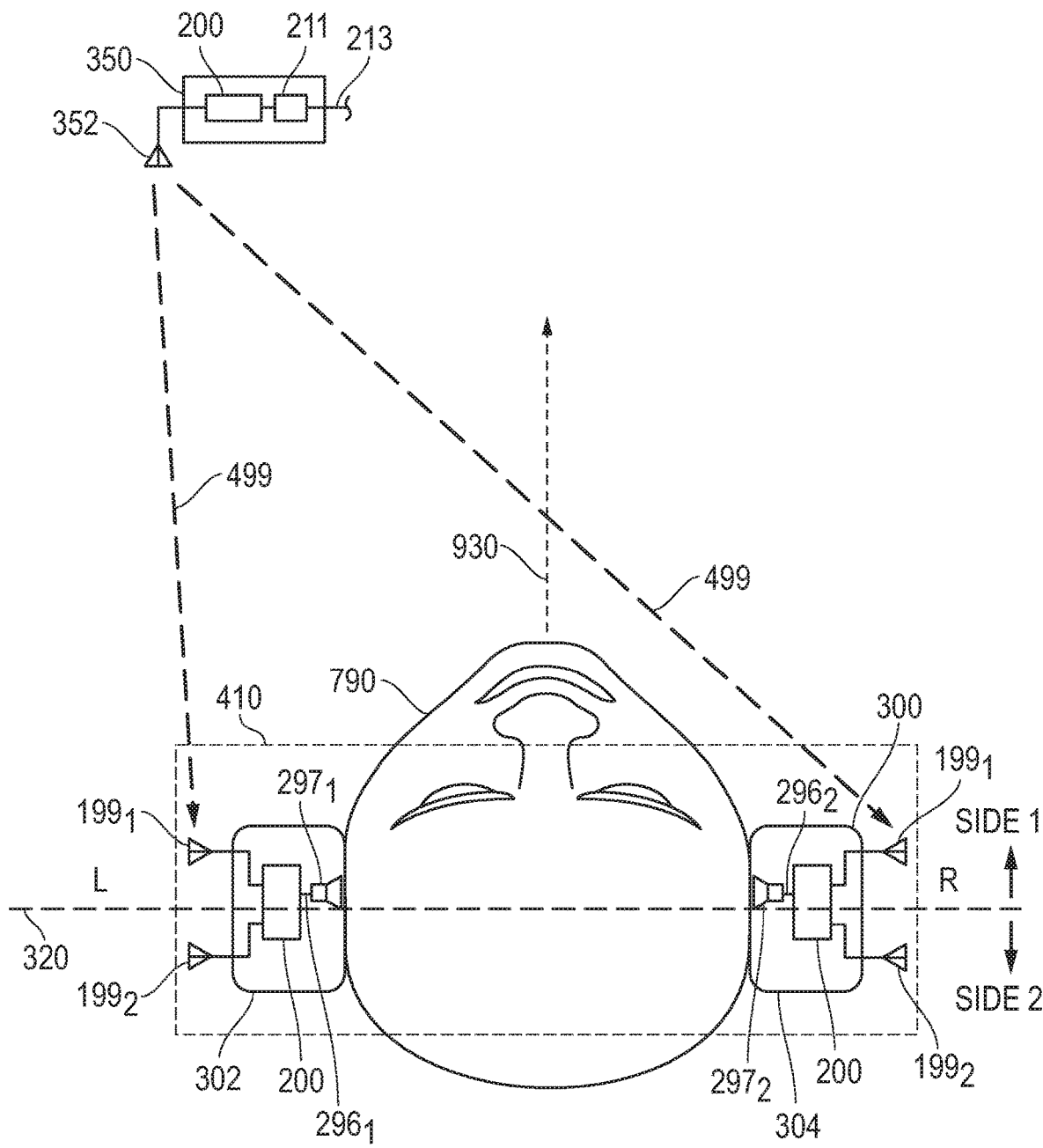
FIG. 7C illustrates an overhead view of a wireless audio receiver system receiving a RF signal from a wireless transmitter device according to one exemplary embodiment of the disclosed systems and methods.

FIGS. 7A-7C illustrate just a few possible embodiments of wireless audio receiver systems such as may be employed in the embodiments of FIGS. 4, 5, 6A and 6B. In this regard, FIG. 7A illustrates one exemplary embodiment of a portable wireless audio receiver system 410 (e.g., a dual speaker battery powered wireless headphone system or wireless earbud system) that includes a first speaker $297_1$ worn adjacent or within the left ear of a user 790 and a second speaker $297_2$ worn adjacent or within the user's right ear. As previously described in relation to the embodiments of FIGS. 4, 5, 6A and 6B, receiver system 410 may be configured to modify audio information of an audio data RF signal transmissions 499 received from a wireless audio transmitter device 350 based on one or more signal reception and/or transmission characteristics of the given audio data transmission 499, and to use speakers $297_1$ and $297_2$ to acoustically reproduce the resulting modified audio data as analog acoustic sound waves that are heard by the left and right ears of the human user 790.

In the embodiment of FIG. 7A, first headphone 302 is coupled to second headphone 304 by a headband 310 that operates to hold first headphone 302 and second headphone 304 of headphone system 410 together on the user's head such that the user may simultaneously listen to a first audio signal $296_1$ that is reproduced to the user's left ear by first speaker $297_1$ and a second audio signal $296_2$ that is reproduced to the user's right ear by second speaker $297_2$. It will be understood that a headphone system may be alternately configured in any other suitable manner, e.g., such as with in-ear speakers (e.g., as separate left and right earbuds or separate left and right hearing aid devices) that are linked together by electrical conductor or linked together by wireless signal connection (e.g., such as illustrated in FIG. 7B) that do not require a headband and/or electrical conductor extending therebetween.

Also in this embodiment, a Bluetooth smart module 200 executing received audio data modification logic 275 is integrated with headphone 302, and is coupled to an antenna array that includes at least two antenna elements $199_1$ and $199_2$ to receive a BLE radio frequency (RF) signal 499. In this embodiment signal 499 includes audio data (e.g., such as unmodified audio data 382 of FIG. 3 that is transmitted from antenna 352 by smart module 200 of an audio source 350, e.g., which may be any of the wireless transmitter devices previously described herein or any other wireless transmitter audio source such as a smart phone, tablet computer, notebook computer, virtual assistant device, music player like a turntable or FM receiver or MP3 player, television set top box, etc. Audio source 350 may also include other optional audio circuitry 211 which may include, for example, internal non-volatile memory (NVM) storing audio files, network interface controller, one or more programmable integrated circuits configured to generate audio from internal NVM audio files and/or from external streaming or wireless audio files/data received from an optional external wired or wireless connection 213 (e.g., 802.11 Wi-Fi, wireless cellular, connection to external NVM, etc.), etc. For simplicity of illustration, not shown in FIG. 7A is switch circuitry 195 of FIGS. 1 and 2 that may be coupled between headphone system smart module 200 and each of antenna elements $199_1$ and $199_2$ as shown in FIGS. 1 and 2. For the same reason, also not shown in FIG. 7A are DEC/DAC circuitry 293 and amplifier circuitry 295 that may be coupled between headphone system smart module 200 and each of speakers $297_1$ and $297_2$ as shown in FIGS. 1 and 2.

As shown in FIG. 7A, headphone system antenna elements $199_1$ and $199_2$ are positioned on either side of an array center plane 320 that separates the front and back sides of the user 790, and that in this case extends between and through the respective bodies of headphones 302 and 304, with planar side 1 facing toward the front side of the user 790 audio source 350 and planar side 2 facing toward the back side of the user 790. In this exemplary embodiment, array center plane 320 is oriented perpendicular to a frontal reference vector 930 that extends forward from front of user 790 and separates the left and right sides of the user, in this case such that antenna element $199_1$ is positioned closer to audio source 350 than is antenna element $199_2$, with array center plane 320 positioned between antenna elements $199_1$ and $199_2$. This allows smart module 200 to measure the strength, time and/or phase of arrival of signal 499 at each of at least two antenna elements $199_1$ and $199_2$ to determine which side (back side or front side of user 790, and/or left side or right side of user 790) and/or from what angle or direction signal 499 is received at user 790 (e.g., using three or more antenna elements 199), e.g., based on measured received signal strength, TOA, TDOA and/or AoA as described further herein and in U.S. patent application ser. no. 16/145,592 entitled "SYSTEMS AND METHODS FOR SELECTING OPERATING MODE BASED ON RELATIVE POSITION OF WIRELESS DEVICES" by Jere M. Knaappila, which is filed concurrently herewith on the same day as the present patent application, and which is incorporated herein by reference in its entirety for all purposes. In this regard, FIGS. 7A-7C illustrate two antenna elements $199_1$ and $199_2$, but it will be understood that three or more antenna elements 199 may be similarly provided in non-aligned relationship where determination of angle relative to defined axis or vector is desired to be performed.

In FIG. 7A, signal 499 arrives first and with greatest signal strength at the antenna element $199_1$ corresponding to the side of center plane 320 that faces audio source 350, i.e., which is side "1" corresponding to antenna element $199_1$ when headphone system 410 is oriented in the position relative to audio source 350 shown in FIG. 7A. In the embodiment of FIG. 7A, knowing beforehand that headphone system 410 is being worn with headphone 302 positioned adjacent the user's left ear and with headphone 304 positioned adjacent the user's right ear as shown in FIG. 7A allows received audio data modification logic 275 to determine that signal 499 of FIG. 7A is being received from side "1" of headphone system 410 from an audio source 350 that is currently positioned in front of the user 790. Further, an angle or direction from which reception of signal 499 at three or more antenna elements 199 may be determined as described elsewhere herein, e.g., using AoA, AoD, etc.

FIG. 7B illustrates another exemplary embodiment of a portable wireless audio receiver system 410 similar to the embodiment of FIG. 7A, except that received audio data modification logic 275 of a first smart module 200 is integrated with first headphone 302, and is configured to cause output of modified analog audio signal via wired channel $296_1$ to first speaker $297_1$ as it is worn adjacent or within the right ear of user 790 in FIG. 7B. However, in this embodiment, received audio data modification logic 275 of first smart module 200 is also configured to wirelessly transmit modified audio data via a RF signal 395 from first headphone 302 to a second smart module 200 of second headphone 304, which is worn adjacent or within the left ear of user 790 in FIG. 7B. In such an embodiment, RF signal 395 is a separate and different RF signal (e.g., such as Bluetooth signal, proprietary digital signal, analog AM or FM signal, etc.) from RF signal 499, and the second smart module 200 outputs the modified audio via DEC/DAC circuitry (not shown in FIG. 7B) as modified analog audio signal via wired channel via wired channel 296$_2$ to first speaker 297$_2$ as it is worn on or in the left ear of user 790 in FIG. 7B. Otherwise, the embodiment of FIG. 7B may be operated to determine whether signal 499 is received from the front side or back side of user 790, and/or from what angle or direction signal 499 is received at user 790.

In yet another embodiment, first smart module 200 of first headphone 302 may be alternatively be configured to use antenna elements 199$_1$ and 199$_2$ to determine spatial positioning information (e.g., including at least one of position, orientation and/or direction of the wireless transmitter device 350 to the wireless receiver device 410), and then to transmit this spatial positioning information from first headphone 302 to the second smart module 200 of second headphone 304 via RF signal 395, such that the second smart module 200 of second headphone 304 may then separately modify information of the received audio channel data based on the spatial positioning information received via RF signal 395. In this regard, RF signal 395 may be separately received with its unmodified audio data from wireless transmitter device 350 at an antenna element 199 of second headphone 304 at the same time that the spatial positioning information is received from first headphone system 302 by second headphone 304 via RF signal 395. In such an example, the unmodified audio data received by second headphone system 304 may then be modified by second smart module 200 of second headphone 304 based on the received spatial position information so as to produce modified audio data that is then reproduced as analog audio acoustic sound waves by speaker 297$_2$ of second headphone 304. Thus, it is possible that one wireless receiver device may transmit spatial information and/or modified audio data in an RF signal to another wireless receiver device, or may transmit spatial information and/or modified audio data in an RF signal from one smart module to another smart module of the same wireless receiver device.

FIG. 7C illustrates another exemplary embodiment of a portable wireless audio receiver system 410 similar to the embodiments of FIGS. 7A and 7B, except that each of the first and second headphones (e.g., or earbuds, hearing aid devices) 302 and 304 are configured with its own antenna array that includes separate antenna elements 199$_1$ and 199$_2$ which independently receive RF signal 499 as shown. In this embodiment, each of headphones 302 and 304 may include a separate integrated smart module 200 that executes received audio data modification logic 275 to cause output of a modified analog audio signal via a respective wired channel 296$_1$ to first speaker 297$_1$ of headphone 302, or via a respective wired channel 296$_2$ to first speaker 297$_2$ of headphone 304 as shown. Otherwise, received audio data modification logic 275 of each of headphones 302 and 304 of the embodiment of FIG. 7C may be operated to independently implement the embodiments of FIGS. 4, 5, 6A and 6B to determine whether signal 499 is received from the front side or back side of user 790, and/or from what angle or direction signal 499 is received at user 790.

Further with regard to FIGS. 7A-7C, it will also be understood that a portable wireless audio receiver system 410 need not include multiple headphones, and that a user may instead operate a portable wireless audio receiver system 410 having only a single headphone adjacent or within only one ear, such as user 490*b* of FIG. 4. Moreover, it will be understood that in some embodiments, received audio data may be modified based only on determination of at what side (front side or back side) of an array center plane 320 that a signal 499 arrives first, e.g., using only TDOA of a signal 499 received at individual elements 199 of an antenna array of an audio receiver such as illustrated in FIGS. 7A-7C. For example, pitch or other information of a reproduced analog audio signal may be modified up or down to indicate that the signal 499 is received from the front or back side of the user 790, e.g., such as modifying the pitch information of the audio data to be relatively higher to indicate that signal 499 is received from the front side of user 790 (corresponding to side 1 of center plane 320) and to be relatively lower to indicate that signal 499 is received from the rear side of user 790 (corresponding to side 2 of center plane 320), or vice-versa.

Figure 8:
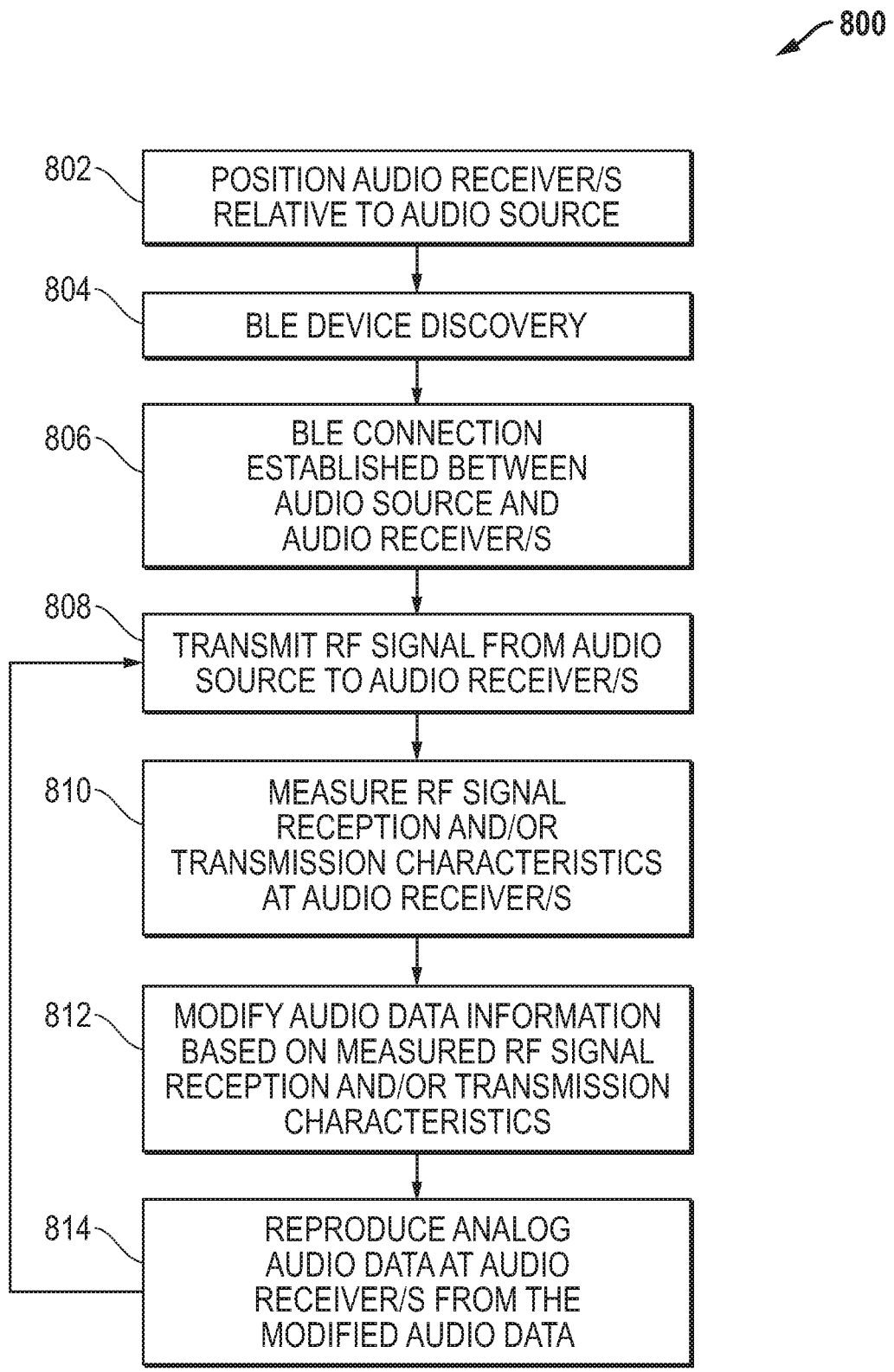
FIG. 8 illustrates methodology according to one exemplary embodiment of the disclosed systems and methods.
Figure 9:
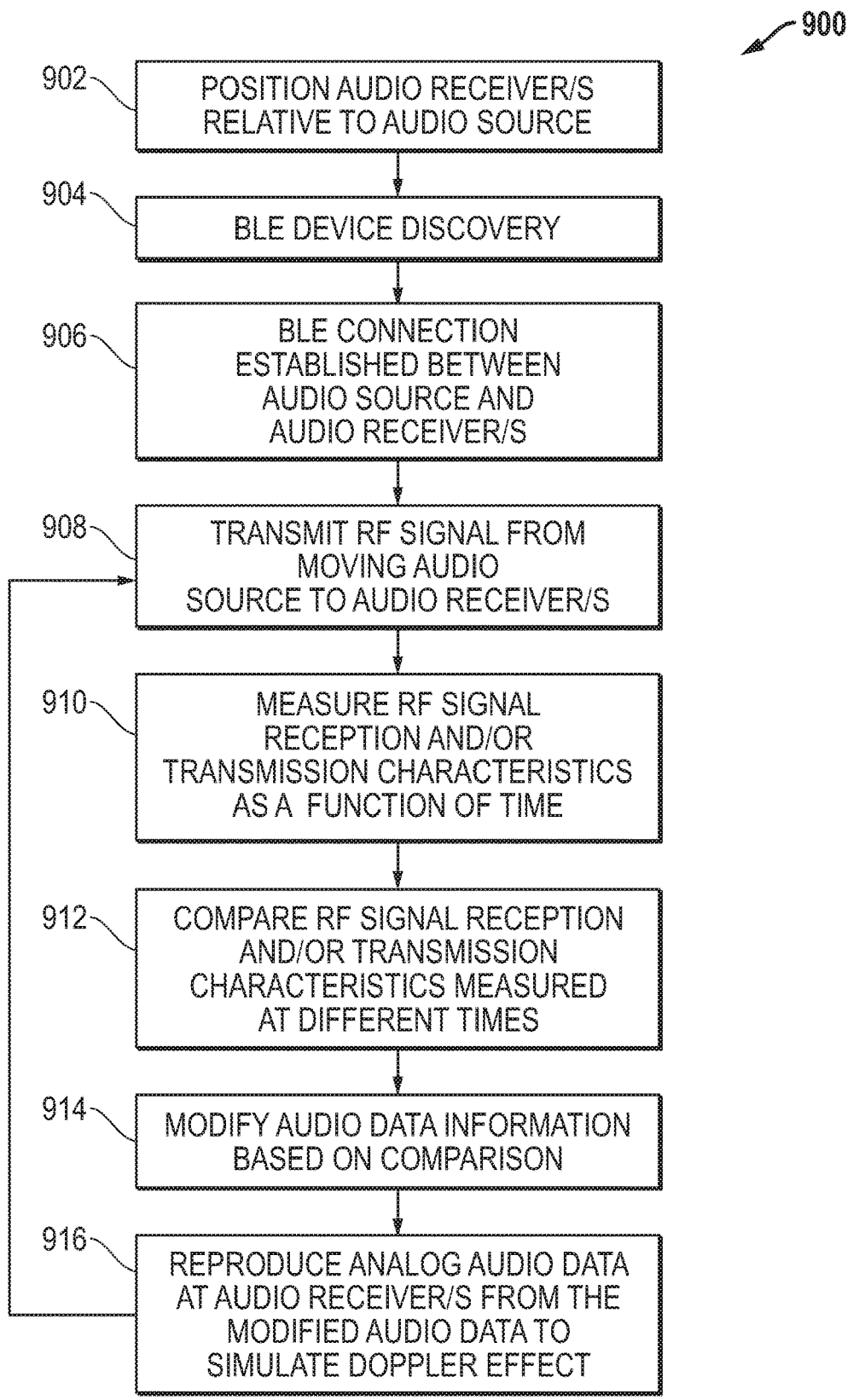
FIG. 9 illustrates methodology according to one exemplary embodiment of the disclosed systems and methods.

FIGS. 8 and 9 illustrate exemplary embodiments of methodologies 800 and 900 that may be employed to modify information of an audio data transmission based on one or more signal reception and/or transmission characteristics of a received radio frequency (RF) signal data transmission that contains or otherwise conveys the audio data transmission in embodiments such as illustrated and described in relation to the previous figures herein. However, it will be understood that methodologies 800 and 900 may be alternatively employed to with other system and device configurations and/or in other types of wireless audio data environments.

Referring first to FIG. 8, methodology 800 begins with step 802 in which a human user is wearing a portable wireless audio receiver system 410 within a wireless audio data environment (e.g., such as illustrated in FIG. 4 or 5) that includes one or more audio sources (e.g., audio data transmitter devices such as television 461, smart phone 463, smoke alarm 467, left stereo loudspeaker 469*a*, right stereo loudspeaker 469*b*, and door intercom 473 of FIG. 4, or public address systems 562 of FIG. 5). Device discovery is then performed in step 804, e.g., BLE device discovery in which the audio sources operate as BLE scanners and the audio receiver system 410 acts as a BLE advertiser, or vice-versa. After device discovery, a connection is established in step 806 between at least one of audio sources and the audio receiver system 410 (which may include multiple receiver devices as in the embodiment of FIG. 7C), e.g., BLE connection with the audio transmitter device acting as master and audio receiver system 410 acting as a slave, or vice versa.

After the connection is established in step 806, a wireless RF signal (e.g., such as RF signal 499 or 599 previously described) conveying audio data is transmitted in step 808 from the audio source to the audio receiver, and then RF signal reception and/or transmission characteristics (e.g., such as AoA, etc.) of the RF signal measured in step 810 by the smart module 200 of the audio receiver. In step 812, received audio data modification logic 275 of the audio receiver may then modify information of the audio data conveyed by the RF signal based on the measured RF signal reception and/or transmission characteristics of step 810 and reproduce the modified audio data as analog acoustic sound waves in step 814 at the speaker/s 297 of the audio receiver.

Steps 808 to 814 may then repeat as shown, modifying the audio data information in real time as the audio receiver changes position relative to the audio source. With regard to methodology 800, the tasks of steps 808 to 814 may be performed, for example, according to the techniques described and illustrated herein in relation to FIGS. 4 and 5.

Referring now to FIG. 9, methodology 900 includes steps 902, 904 and 906 (corresponding to previously-described steps 802, 804 and 806 of FIG. 8) that are performed to establish a connection between an audio receiver system 410 and an audio source (e.g., such as audio data transmitter device 662 on moving platform 663 of FIGS. 6A and 6B) that is moving relative to the audio receiver system 410. Next, a wireless RF signal (e.g., such as RF signal 699 previously described) conveying audio data is transmitted in step 908 from the moving audio source to the audio receiver. Then in step 910 one or more RF signal reception and/or transmission characteristics (e.g., such as received signal strength, AoA, etc.) of the RF signal are measured as a function of time (e.g., continuously or at defined time intervals (e.g., every 1 second, every 2 seconds, every 3 seconds, etc.) by the smart module 200 of the audio receiver over a cumulative period of time, and multiple measurement values of the RF signal reception and/or transmission characteristics are stored in system memory at these successive different times. Then in step 912, the RF signal reception and/or transmission characteristics (e.g., received signal strength, AoA, etc.) measured in step 910 at different times are compared to each other, and the information of the audio data conveyed by RF signal 699 modified in real time during step 914 based on the comparison of step 912 so as to adjust the pitch of the acoustic sound waves produced in step 916 by the wireless device speakers 297 according to the real time rate of changing measured RF signal reception and/or transmission characteristics as a function of time so as to simulate a Doppler effect produced by a hypothetical acoustic sound wave source that is moving relative to the audio source, e.g., in a manner as described and illustrated in relation to FIGS. 6A and 6B. As shown, steps 908 to 916 may continuously repeat so that the Doppler effect changes in real time with changes in movement (e.g., direction and/or speed) between the audio source and the audio receiver device 410.

It will be understood that methodologies 800 and 900 of FIGS. 8 and 9 are exemplary only, and that different combinations of fewer, additional, re-ordered and/or alternative steps may be employed in other embodiments.

In the implementation of BLE wireless communications such as described herein, example advertising packet types that may be transmitted from an advertiser (or broadcaster) device include:

| | |
|---|---|
| ADV_IND | connectable and scannable undirected advertising event |
| ADV_DIRECT_IND | connectable directed advertising event |
| ADV_NONCONN_IND | non-connectable or non-scannable undirected advertising event |
| ADV_SCAN_IND | scannable undirected (non-connectable) advertising event. |

In BLE advertising (or broadcast state), an advertising device or broadcaster uses its link layer to control advertising packet transmit during recurring spaced advertising events. During each advertising event advertising packets are transmitted in round robin fashion on one advertising channel of three designated advertising channels at a time (BLE advertising channels 37, 38 and 39), one or more of which may be received by a link layer of a scanning (or observer) device that is listening on the different advertising channels one at a time. The link layer of the advertising (or broadcaster) device may use packet transmission timing parameters to control timing of sequential advertising events at determined advertising event time intervals (T_advEvent) from each other using a pseudorandom number generator that implements a pseudorandom number generation algorithm. Broadcast advertising packets are non-connectable. During advertising (or broadcast) state, a link layer of a scanning device scans for and listens for advertising packets on the different advertising channels at sequential listening window times of a scanning sequence that are spaced apart from each other by a determined scan interval, scan_Int that is not synchronized with the advertising events. In some cases, a scanning (or observer) device may continuously listen for advertising packets to ensure timely reception of same. Further information on advertising or broadcasting timing may be found described in United States Patent Application Publication Number 20180007523, and in U.S. patent application Ser. No. 15/650,405, filed Jul. 14, 2017, each of which is incorporated herein by reference in its entirety for all purposes.

Example types of response packets that may be transmitted by a scanning device in response to received advertising packets of the advertising device include:

| | |
|---|---|
| SCAN_REQ | scan request for further information from advertiser |
| CONNECT_REQ | connect request. |

If the advertiser device sends either the ADV_IND or ADV_DIRECT_IND packets, a scanner desiring to exchange data with the advertiser may send a CONNECT_REQ packet. If the advertiser accepts the CONNECT_REQ packet, the devices become connected and the communication may be started. At this point, the advertiser becomes a slave and the scanner becomes a master. After connected, the master device may request bonding with the slave device. This means that the devices exchange long term keys or other encryption info to be stored for future connections. In another case, the connection may be encrypted only for the duration of the connection by pairing, during which short term keys are exchanged between the master device and slave device. Pairing with short term key exchange is normally required to occur before bonding between the devices may occur the first time. Exchange of long term keys or other encryption information for bonding may then occur during the paired connection. Once a master device and slave device have exchanged long term keys or other encryption info, a master device may request bonding directly with the slave device without requiring pairing first.

Instead of the CONNECT_REQ, the scanner device may also respond with SCAN_REQ, which is a request for further information from the advertiser. This may be sent as a response to ADV_IND or ADV_SCAN_IND advertising packets.

When an advertising receives a SCAN_REQ packet from a scanning device, the advertising device may give more information to the scanning device by transmitting a scan response (SCAN_RSP) packet. A SCAN_RSP packet may contain information on the name of the advertising device and on the services the advertising device is able to provide. However, SCAN_RSP packet is not limited to carry only this information but may contain other data as well or instead.

As said, a scanning device wishing to connect with the advertising device may send a CONNECT_REQ packet that contains data on one or more of the following: transmit window size defining timing window for first data packet, transmit window offset that is off when the transmit window starts, connection interval which is the time between connection events, slave latency defines number of times the slave may ignore connection events from the master, connection timeout is maximum time between two correctly received packets in the connection before link is considered to be lost, hop sequence is a random number appointing the starting point for a hop, channel map, CRC (Cyclic Redundancy Check) initialization value. The CONNECT_REQ packet initiates the connection, i.e., creates a point-to-point connection between the devices. After a connection is established between two devices, service and/or service characteristic discovery may occur (with or without pairing or bonding first taking place) during which a first one of the connected devices may send a request to the second connected device asking for a list of services and/or service characteristics that are available from the second device. For example, the second device may respond to this request by providing GATT data to the first device that includes a list of the available BLE services from the second device and/or BLE service characteristics (e.g., configuration data or user data for a service) of the second device. The GATT data may include a list of service universally unique identifiers (UUIDs) and/or service characteristic UUIDs.

Once a connection is established between a pair of wireless devices (e.g., acting as nodes in a mesh network as described herein), the two devices may synchronize timing for non-continuous periodic connection events to follow in order to reduce power consumption. In the BLE specification, the connection interval may be selected to be any value from 7.5 milliseconds to four seconds. This interval may be selected by the master device and transmitted to the slave of the connection. During any given connection event, each wireless device may listen for data packets transmitted in a signal from the other device, and/or transmit data packets to the other device when there is data to send. One or both devices may remain in a sleep or inactive state between the synchronized connection events, during which various device components including radio transmitter, receiver or transceiver components (and possibly one or more wireless device processing devices) are placed in an inactive state to reduce device power consumption. For example, a slave device may ignore any one or more connection events and remain in a sleep state (e.g., with radio not transmitting or listening) during one or more connection events when the slave has no new data to send. In BLE, an integer SLAVE_LATENCY value may be selected to specify the number of consecutive connection events that may be ignored by the slave device before it must wake up and respond to the master to confirm continued existence of the current connection. Because connection events are synchronized during a connection, and because a number of connection events may be ignored, wireless communication in the connected state consumes much less power than in the advertising (or broadcast) state where transmission of advertising packets from the advertising (or broadcasting) device occurs on multiple advertising channels during each advertising event, and where scanning device listening windows are not synchronized with the channel transmissions of the advertising events.

The state for passing advertising packets is called "advertising state" or "broadcast state" as the case may be, and the state for connection is called "connected state". In both states, data transfer occurs. A slave device may be a sensor, actuator or other device, such as a temperature sensor, heart rate sensor, lighting device, proximity sensor, etc. A master device may be any electronic device capable of collecting data, e.g., mobile phone, smart phone, personal digital assistant, personal computer, laptop computer, tablet computer, etc.

Packets sent from a slave device in advertising mode may contain approximately 28 bytes of data and a slave address. Packets from a master device in advertisement channel may contain scanner and advertiser addresses. According to an embodiment, the packets from a master device in advertisement channel contains only a master address. Further information on BLE operations and communications may be found, for example, in United States Patent Application Publication No. 2014/0321321; United States Patent Application Publication No. 2015/0319600; and United States Patent Application Publication No. 2015/0271628, each of which is incorporated herein by reference in its entirety for all purposes.

Embodiments of the disclosed systems and methods may implement BLE wireless communication according to one or more BLE specifications such as Bluetooth 4.x (e.g., Bluetooth 4.0, 4.1, 4.2) core version specifications, Bluetooth 5 core version specification, addendums and supplements thereto, etc. that are available from the Bluetooth Special Interest Group (SIG). However, it will be understood that the above described BLE embodiments are exemplary only, and that the systems and methods described in relation to FIGS. 1-6 may be implemented for non-BLE wireless protocol communication, and/or may be implemented to transmit packets other than BLE packets between two BLE wireless devices.

It will also be understood that one or more of the tasks, functions, or methodologies described herein for a radio module or radio device (e.g., including those described herein for module segment 110 and module segment 120 of FIG. 1 including CPU 150, BLE controller 230 (e.g., baseband 234), DEC/DAC 293, amplifier circuitry 295, switch 195, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device or programmed circuitry in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

Further, while the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
   receiving a radio frequency (RF) signal at a first device, the RF signal conveying digital audio data and being transmitted directly to the first device from a second device, with the digital audio data being contained within the RF signal;
   measuring one or more RF signal reception or transmission characteristics of the RF signal that contains the digital audio data, the one or more RF signal reception or transmission characteristics of the RF signal being measured as the RF signal arrives at the first device directly from the second device;
   then extracting the conveyed digital audio data from the received RF signal at the first device;
   then producing modified digital audio data at the first device by internally modifying digital data of the conveyed digital audio data as it is received at the first device directly from the second device based on the measured RF signal reception or transmission characteristics of the RF signal only as the RF signal arrives at the first device directly from the second device;
   then converting the modified digital audio data to an analog output signal; and
   then reproducing analog audio acoustic sound waves from the analog output signal.

2. The method of claim 1, where the one or more RF signal reception or transmission characteristics of the received RF signal comprise at least one of time of arrival (TOA) of the received RF signal at the first device, Time Difference of Arrival (TDOA) of the received RF signal at the first device, Angle of Arrival (AoA) of the received RF signal at the first device, Angle of Departure (AoD) of the received RF signal from the second device, and measured received RF signal strength of the received RF signal received at the first device.

3. The method of claim 1, further comprising determining at least one of position, orientation and/or direction of the first device relative to the second device based on the measured one or more RF signal reception or transmission characteristics of the RF signal only as it the RF signal arrives at the first device directly from the second device; and modifying digital data of the conveyed digital audio data based on the determined position, orientation and/or direction of the first device relative to the second device.

4. The method of claim 1, further comprising:
   producing the modified digital audio data at the first device by internally varying at least one of gain, tone, equalization and/or pitch information of the digital audio data based on the measured one or more RF signal reception or transmission characteristics of the RF signal only as it the RF signal arrives at the first device directly from the second device;
   then converting the modified digital audio data to an analog output signal; and
   then reproducing analog audio acoustic sound waves from the analog output signal at one or more speakers of the first device.

5. The method of claim 1, where the one or more RF signal reception or transmission characteristics of the received RF signal comprise measured received RF signal strength of the RF signal received at the first device; and where the method further comprises:
   producing the modified digital audio data at the first device by internally varying gain information of the digital audio data based on the measured received RF signal strength of the RF signal received at the first device by applying relatively lesser attenuation for relatively greater values of measured RF signal strength and applying relatively greater attenuation for relatively lesser values of measured RF signal strength to simulate distance from the first device to the second device that is transmitting the RF signal; and
   then converting the modified digital audio data to an analog output signal; and
   then reproducing analog audio acoustic sound waves from the analog output signal at one or more speakers of the first device.

6. The method of claim 1, further comprising determining at least one of distance, position, orientation and/or direction of the first device relative to the second device based on the measured one or more RF signal reception or transmission characteristics of the RF signal only as it the RF signal arrives at the first device directly from the second device; and internally modifying digital data of the conveyed digital audio data based on the determined distance, position, orientation and/or direction of the first device relative to the second device by adding synthesized speech to the digital audio data that describes in verbal form the distance, position, orientation and/or direction of the first device relative to the second device.

7. The method of claim 1, further comprising measuring the one or more RF signal reception or transmission characteristics of the RF signal when the RF signal arrives at an antenna element of the first device directly from the second device.

8. The method of claim 1, where the RF signal received at the first device is a modulated RF signal conveying digital audio data and being transmitted from the second device with the digital audio data contained within the modulated RF signal; and where the method further comprises:
   measuring the one or more RF signal reception or transmission characteristics of the modulated RF signal that contains the audio data, the one or more RF signal reception or transmission characteristics of the modulated RF signal being measured as the modulated RF signal arrives at the first device directly from the second device;

then demodulating the modulated RF signal;
then extracting the conveyed audio data from the demodulated RF signal at the first device;
then producing the modified digital audio data at the first device by internally modifying the digital data of the conveyed digital audio data as it is received at the first device directly from the second device based on the measured RF signal reception or transmission characteristics of the modulated RF signal only as the RF signal arrives at the first device directly from the second device;
then converting the modified digital audio data to an analog output signal; and
then reproducing analog audio acoustic sound waves from the analog output signal.

9. A method, comprising:
receiving a radio frequency (RF) signal at a first device, the RF signal conveying audio data and being transmitted directly to the first device from a second device;
measuring one or more RF signal reception or transmission characteristics of the RF signal as it is received at the first device directly from the second device;
producing modified audio data at the first device by modifying information of the conveyed audio data as it is received at the first device directly from the second device based on the measured RF signal reception or transmission characteristics of the RF signal only as it is received at the first device directly from the second device; and
reproducing analog audio acoustic sound waves from the modified audio data;
where the audio data comprises at least first channel audio data and second channel audio data; and where the method further comprises:
producing the modified audio data at the first device by individually varying volume level and/or pitch level information of the first channel audio data relative to volume level and/or pitch level information of the second channel audio data based on the measured RF signal reception or transmission characteristics of the RF signal received from the second device, and
simultaneously reproducing analog audio acoustic sound waves from the first channel audio data of the modified audio data at a first speaker of the first device and reproducing analog audio acoustic sound waves from the second channel audio data of the modified audio data at a second speaker of the first device.

10. A method, comprising:
receiving a radio frequency (RF) signal at a first device, the RF signal conveying audio data and being transmitted from a second device;
measuring one or more RF signal reception or transmission characteristics of the received RF signal at the first device;
producing modified audio data at the first device by modifying information of the conveyed audio data based on the measured RF signal reception or transmission characteristics; and
reproducing analog audio acoustic sound waves from the modified audio data;
where the audio data comprises at least first channel audio data and second channel audio data; and where the method further comprises:
producing the modified audio data at the first device by individually varying volume level and/or pitch level information of the first channel audio data relative to volume level and/or pitch level information of the second channel audio data based on the measured RF signal reception or transmission characteristics of the RF signal received from the second device; and
simultaneously reproducing analog audio acoustic sound waves from the first channel audio data of the modified audio data at a first speaker of the first device and reproducing analog audio acoustic sound waves from the second channel audio data of the modified audio data at a second speaker of the first device; and
where the first device comprises a portable wireless audio data receiver system that comprises a first speaker worn adjacent a left ear of a human user and a second speaker worn adjacent a right ear of the same human user; and where the method further comprises:
determining at least one of position, orientation and/or direction of the first device relative to the second device based on the measured one or more RF signal reception or transmission characteristics of the received RF signal at the first device,
producing the modified audio data at the first device by individually varying volume level and/or pitch level information of the first channel audio data relative to volume level and/or pitch level information of the second channel audio data based on the determined position, orientation and/or direction of the first device relative to the second device to produce modified audio data having first and second audio channels that have different volume level and/or pitch level information relative to each other, and
simultaneously reproducing analog audio acoustic sound waves from the first channel audio data of the modified audio data at the first speaker of the portable wireless audio data receiver system and reproducing analog audio acoustic sound waves from the second channel audio data of the modified audio data at the second speaker of the portable wireless audio data receiver system.

11. The method of claim 10, where the first channel audio data corresponds to the left side of the human user and the second channel audio data corresponds to the right side of the human user; and where the method further comprises producing the modified audio data at the first device to indicate to a user the direction from which the RF signal is received by:
producing the modified audio data at the first device so that volume level information of the first channel audio data is greater than volume level information of the second channel audio data when the RF signal is received at the first device from the left side of the human user, and so that volume level information of the second channel audio data is greater than volume level information of the first channel audio data when the RF signal is received at the first device from the right side of the human user.

12. The method of claim 11, further comprising:
measuring at least one of Angle of Arrival (AoA) of the received RF signal at the first device or Angle of Departure (AoD) of the RF signal received at the first device;
determining a direction from which the RF signal is received from the second device at the first device from the measured AoA or AoD; and
producing the modified audio data at the first device by individually varying the volume level information of the first channel audio data and second channel audio data to vary the audio balance between the reproduced analog audio acoustic sound waves of the first and second speakers to produce an indicated audio point of origin that corresponds to the determined direction from which the RF signal is received from the second device at the first device.

13. The method of claim 10, where the first channel audio data corresponds to the left side of the human user and the second channel audio data corresponds to the right side of the human user; and where the method further comprises producing the modified audio data at the first device to indicate to a user the direction from which the RF signal is received by only one of:

producing the modified audio data at the first device such that pitch level information of the first channel audio data is higher than pitch level information of the second channel audio data when the RF signal is received at the first device from the left side of the human user, and such that pitch level information of the second channel audio data is higher than pitch level information of the first channel audio data when the RF signal is received at the first device from the right side of the human user; or producing the modified audio data at the first device so that pitch level information of the first channel audio data is lower than pitch level information of the second channel audio data when the RF signal is received at the first device from the left side of the human user, and so that pitch level information of the second channel audio data is lower than pitch level information of the first channel audio data when the RF signal is received at the first device from the right side of the human user.

14. A method, comprising:

receiving a radio frequency (RF) signal at a first device, the RF signal conveying audio data and being transmitted from a second device;

measuring one or more RF signal reception or transmission characteristics of the received RF signal at the first device;

producing modified audio data at the first device by modifying information of the conveyed audio data based on the measured RF signal reception or transmission characteristics; and reproducing analog audio acoustic sound waves from the modified audio data;

where at least one of the first device is moving relative to the second device or the second device is moving relative to the first device while the first device is receiving the RF signal being transmitted from the second device; and where the method further comprises:

making at least two measurements of the one or more RF signal reception or transmission characteristics of the received RF signal at the first device, the two measurements being made at sequential times that correspond to sequential different relative positions between the second device and the first device while at least one of the first device is moving relative to the second device or the second device is moving relative to the first device, comparing the at least two sequential measurements of RF signal reception or transmission characteristics to determine a real time rate of change of the RF signal reception or transmission characteristics as a function of time, producing the modified audio data at the first device by varying pitch information of the audio data based on the real time change in measured RF signal reception or transmission characteristics of the RF signal received from the second device as a function of time, and reproducing analog audio acoustic sound waves from the modified audio data at one or more speakers of the first device to simulate a Doppler effect.

15. An apparatus, comprising at least one programmable integrated circuit coupled to radio circuitry of a first device, the programmable integrated circuit being programmed to operate the first device to:

receive a radio frequency (RF) signal at a first device, the RF signal conveying digital audio data and being transmitted directly to the first device from a second device, with the digital audio data being contained within the RF signal;

measure one or more RF signal reception or transmission characteristics of the RF signal that contains the digital audio data, the one or more RF signal reception or transmission characteristics of the RF signal being measured as the RF signal arrives at the first device directly from the second device;

then extract the conveyed digital audio data from the received RF signal at the first device;

then produce modified digital audio data at the first device by internally modifying digital data of the conveyed digital audio data as it is received at the first device directly from the second device based on the measured one or more RF signal reception or transmission characteristics of the RF signal only as the RF signal arrives at the first device directly from the second device;

then convert the modified digital audio data to an analog output signal; and then reproduce analog audio acoustic sound waves from the analog output signal.

16. The apparatus of claim 15, where the one or more RF signal reception or transmission characteristics of the received RF signal comprise at least one of time of arrival (TOA) of the received RF signal at the first device, Time Difference of Arrival (TDOA) of the received RF signal at the first device, Angle of Arrival (AoA) of the received RF signal at the first device, Angle of Departure (AoD) of the received RF signal from the second device, and measured received RF signal strength of the received RF signal received at the first device.

17. The apparatus of claim 15, where the programmable integrated circuit is further programmed to operate the first device to: determine at least one of position, orientation and/or direction of the first device relative to the second device based on the measured one or more RF signal reception or transmission characteristics of the RF signal only as it the RF signal arrives at the first device directly from the second device; and modify digital data of the conveyed digital audio data based on the determined position, orientation and/or direction of the first device relative to the second device.

18. The apparatus of claim 15, further comprising one or more speakers; and where the programmable integrated circuit is further programmed to operate the first device to:

produce the modified digital audio data at the first device by internally varying at least one of gain, tone, equalization and/or pitch information of the digital audio data based on the measured one or more RF signal reception or transmission characteristics of the RF signal only as it the RF signal arrives at the first device directly from the second device;

then convert the modified digital audio data to an analog output signal; and then reproduce analog audio acoustic sound waves from the analog output signal at one or more speakers of the first device.

19. The apparatus of claim 15, further comprising one or more speakers; where the one or more RF signal reception or transmission characteristics of the received RF signal comprise measured received RF signal strength of the RF signal received at the first device; and where the programmable integrated circuit is further programmed to operate the first device to:
produce the modified digital audio data at the first device by internally varying gain information of the digital audio data based on the measured received RF signal strength of the RF signal received at the first device by applying relatively lesser attenuation for relatively greater values of measured RF signal strength and applying relatively greater attenuation for relatively lesser values of measured RF signal strength to simulate distance from the first device to the second device that is transmitting the RF signal; and
then convert the modified digital audio data to an analog output signal; and
then reproduce analog audio acoustic sound waves from the analog output signal at one or more speakers of the first device.

20. The apparatus of claim 15, further comprising one or more speakers; and where the programmable integrated circuit is further programmed to operate the first device to: determine at least one of distance, position, orientation and/or direction of the first device relative to the second device based on the measured one or more RF signal reception or transmission characteristics of the received RF signal at the first device; and internally modify digital data of the conveyed digital audio data based on the determined distance, position, orientation and/or direction of the first device relative to the second device by adding synthesized speech to the digital audio data that describes in verbal form the distance, position, orientation and/or direction of the first device relative to the second device.

21. The apparatus of claim 15, where the RF signal received at the first device is a modulated RF signal conveying digital audio data and being transmitted from the second device with the digital audio data contained within the modulated RF signal; and where the programmable integrated circuit is programmed to operate the first device to:
measure the one or more RF signal reception or transmission characteristics of the modulated RF signal that contains the audio data, the one or more RF signal reception or transmission characteristics of the modulated RF signal being measured as the modulated RF signal arrives at the first device directly from the second device;
then demodulate the modulated RF signal;
then extract the conveyed audio data from the demodulated RF signal at the first device;
then produce the modified digital audio data at the first device by internally modifying the digital data of the conveyed digital audio data as it is received at the first device directly from the second device based on the measured RF signal reception or transmission characteristics of the modulated RF signal only as the RF signal arrives at the first device directly from the second device;
then convert the modified digital audio data to an analog output signal; and
then reproduce analog audio acoustic sound waves from the analog output signal.

22. The apparatus of claim 15, where the programmable integrated circuit is programmed to operate the first device to measure the one or more RF signal reception or transmission characteristics of the RF signal when the RF signal arrives at an antenna element of the first device directly from the second device.

23. An apparatus, comprising at least one programmable integrated circuit coupled to radio circuitry of a first device, the programmable integrated circuit being programmed to operate the first device to:
receive a radio frequency (RF) signal at a first device, the RF signal conveying audio data and being transmitted directly to the first device from a second device;
measure one or more RF signal reception or transmission characteristics of the RF signal as it is received at the first device directly from the second device;
produce modified audio data at the first device by modifying information of the conveyed audio data as it is received at the first device directly from the second device based on the measured one or more RF signal reception or transmission characteristics of the RF signal only as it is received at the first device directly from the second device; and
reproduce analog audio acoustic sound waves from the modified audio data; and
where the apparatus further comprises at least a first speaker and a second speaker; where the audio data comprises at least first channel audio data and second channel audio data; and where the programmable integrated circuit is further programmed to operate the first device to:
produce the modified audio data at the first device by individually varying volume level and/or pitch level information of the first channel audio data relative to volume level and/or pitch level information of the second channel audio data based on the measured RF signal reception or transmission characteristics of the RF signal received from the second device, and
simultaneously reproduce analog audio acoustic sound waves from the first channel information of the modified audio data at the first speaker of the first device and reproduce analog audio acoustic sound waves from the second channel information of the modified audio data at the second speaker of the first device.

24. An apparatus, comprising at least one programmable integrated circuit coupled to radio circuitry of a first device, the programmable integrated circuit being programmed to operate the first device to:
receive a radio frequency (RF) signal at a first device, the RF signal conveying audio data and being transmitted from a second device;
measure one or more RF signal reception or transmission characteristics of the received signal at the first device;
produce modified audio data at the first device by modifying information of the conveyed audio data based on the measured RF signal reception or transmission characteristics; and
reproduce analog audio acoustic sound waves from the modified audio data;
where the apparatus further comprises at least a first speaker and a second speaker; where the audio data comprises at least first channel audio data and second channel audio data; and where the programmable integrated circuit is further programmed to operate the first device to:
produce the modified audio data at the first device by individually varying volume level and/or pitch level information of the first channel audio data relative to volume level and/or pitch level information of the second channel audio data based on the measured RF signal reception or transmission characteristics of the RF signal received from the second device, and
simultaneously reproduce analog audio acoustic sound waves from the first channel information of the modified audio data at the first speaker of the first device and reproduce analog audio acoustic sound waves from the second channel information of the modified audio data at the second speaker of the first device; and
where the first device comprises a portable wireless audio data receiver system that comprises a first speaker configured to be worn adjacent a left ear of a human user and a second speaker configured to be worn adjacent a right ear of the same human user; and where the programmable integrated circuit is further programmed to operate the first device to:
determine at least one of position, orientation and/or direction of the first device relative to the second device based on the measured one or more RF signal reception or transmission characteristics of the received RF signal at the first device,
produce the modified audio data at the first device by individually varying volume level and/or pitch level information of the first channel audio data relative to volume level and/or pitch level information of the second channel audio data based on the determined position, orientation and/or direction of the first device relative to the second device to produce modified audio data having first and second audio channels that have different volume level and/or pitch level information relative to each other such that the volume level information and/or pitch level information of the first channel audio data is different from the volume level information and/or pitch level information of the second channel audio data to indicate to a user of the first device the direction from which the RF signal is received, and
simultaneously reproduce analog audio acoustic sound waves from the first channel information of the modified audio data at the first speaker of the portable wireless audio data receiver system and reproducing analog audio acoustic sound waves from the second channel information of the modified audio data at the second speaker of the portable wireless audio data receiver system.

25. An apparatus, comprising at least one programmable integrated circuit coupled to radio circuitry of a first device, the programmable integrated circuit being programmed to operate the first device to:
receive a radio frequency (RF) signal at a first device, the RF signal conveying audio data and being transmitted from a second device;
measure one or more RF signal reception or transmission characteristics of the received signal at the first device;
produce modified audio data at the first device by modifying information of the conveyed audio data based on the measured RF signal reception or transmission characteristics; and
reproduce analog audio acoustic sound waves from the modified audio data;
where the apparatus further comprises one or more speakers; and where the programmable integrated circuit is further programmed to operate the first device to:
make at least two measurements of the one or more RF signal reception or transmission characteristics of the received RF signal at the first device, the two measurements being made at sequential times that correspond to sequential different relative positions between the second device and the first device while at least one of the first device is moving relative to the second device or the second device is moving relative to the first device,
compare the at least two sequential measurements of RF signal reception or transmission characteristics to determine a real time rate of change of the RF signal reception or transmission characteristics as a function of time,
produce the modified audio data at the first device by varying pitch information of the audio data based on the real time change in measured RF signal reception or transmission characteristics of the RF signal received from the second device as a function of time, and
reproduce analog audio acoustic sound waves from the modified audio data at one or more speakers of the first device to simulate a Doppler effect.

26. A system, comprising:
a first device having at least one first programmable integrated circuit coupled to radio circuitry of the first device;
a second device having at least one second programmable integrated circuit coupled to radio circuitry of the second device;
where the second programmable integrated circuit of the second device is programmed to control operation of the second device to transmit a radio frequency (RF) signal directly from the second device to the first device, with digital audio data being contained within the RF signal; and
where the first programmable integrated circuit of the first device is programmed to operate the first device to:
receive the RF signal at the first device, the RF signal conveying the digital audio data within the RF signal and the RF signal being transmitted directly to the first device from the second device,
measure one or more RF signal reception or transmission characteristics of the RF signal that contains the digital audio data, the one or more RF signal reception or transmission characteristics of the RF signal being measured as the RF signal arrives at the first device directly from the second device,
then extract the conveyed digital audio data from the received RF signal at the first device,
then produce modified digital audio data at the first device by internally modifying digital data of the conveyed digital audio data as it is received at the first device directly from the second device based on the measured RF signal reception or transmission characteristics of the RF signal only as the RF signal arrives at the first device directly from the second device,
then convert the modified digital audio data to an analog output signal; and
then reproduce analog audio acoustic sound waves from the analog output signal.

27. The system of claim 26, where the one or more RF signal reception or transmission characteristics of the received RF signal comprise at least one of time of arrival (TOA) of the received RF signal at the first device, Time Difference of Arrival (TDOA) of the received RF signal at the first device, Angle of Arrival (AoA) of the received RF signal at the first device, Angle of Departure (AoD) of the received RF signal from the second device, and measured received RF signal strength of the received RF signal received at the first device; and where the first programmable integrated circuit is further programmed to operate the first device to:
- determine at least one of position, orientation and/or direction of the first device relative to the second device based on the measured one or more RF signal reception or transmission characteristics of the RF signal only as it the RF signal arrives at the first device directly from the second device; and
- then internally modify the digital data of the conveyed digital audio data based on the determined position, orientation and/or direction of the first device relative to the second device.

28. The system of claim 26, where the first device comprises one or more speakers; and where the first programmable integrated circuit is further programmed to operate the first device to:
- produce the modified audio data at the first device by internally varying at least one of gain, tone, equalization and/or pitch information of the digital audio data based on the measured one or more RF signal reception or transmission characteristics of the RF signal only as it the RF signal arrives at the first device directly from the second device;
- then convert the modified digital audio data to an analog output signal; and
- then reproduce analog audio acoustic sound waves from the analog output signal at one or more speakers of the first device.

29. The system of claim 26, where the first device comprises one or more speakers; where the one or more RF signal reception or transmission characteristics of the received RF signal comprise measured received RF signal strength of the RF signal received at the first device; and where the first programmable integrated circuit is further programmed to operate the first device to:
- produce the modified audio data at the first device by internally varying gain information of the digital audio data based on the measured received RF signal strength of the RF signal received at the first device by applying relatively lesser attenuation for relatively greater values of measured RF signal strength and applying relatively greater attenuation for relatively lesser values of measured RF signal strength to simulate distance from the first device to the second device that is transmitting the RF signal;
- then convert the modified digital audio data to an analog output signal; and
- then reproduce analog audio acoustic sound waves from the analog output signal at one or more speakers of the first device.

30. The system of claim 26, where the first device comprises one or more speakers; and where the first programmable integrated circuit is further programmed to operate the first device to: determine at least one of distance, position, orientation and/or direction of the first device relative to the second device based on the measured one or more RF signal reception or transmission characteristics of the RF signal only as the RF signal arrives at the first device directly from the second device; and to modify digital data of the conveyed digital audio data based on the determined distance, position, orientation and/or direction of the first device relative to the second device by adding synthesized speech to the digital audio data that describes in verbal form the distance, position, orientation and/or direction of the first device relative to the second device.

31. The system of claim 26, where the second programmable integrated circuit of the second device is programmed to control operation of the second device to transmit the RF signal as a modulated RF signal directly from the second device to the first device, the modulated RF signal conveying digital audio data with the digital audio data contained within the modulated RF signal; and where the first programmable integrated circuit of the first device is programmed to operate the first device to:
- measure the one or more RF signal reception or transmission characteristics of the modulated RF signal that contains the audio data, the one or more RF signal reception or transmission characteristics of the modulated RF signal being measured as the modulated RF signal arrives at the first device directly from the second device;
- then demodulate the modulated RF signal;
- then extract the conveyed audio data from the demodulated RF signal at the first device;
- then produce the modified digital audio data at the first device by internally modifying the digital data of the conveyed digital audio data as it is received at the first device directly from the second device based on the measured RF signal reception or transmission characteristics of the modulated RF signal only as the RF signal arrives at the first device directly from the second device;
- then convert the modified digital audio data to an analog output signal; and
- then reproduce analog audio acoustic sound waves from the analog output signal.

32. The system of claim 26, where the first programmable integrated circuit of the first device is programmed to operate the first device to measure the one or more RF signal reception or transmission characteristics of the RF signal when the RF signal arrives at an antenna element of the first device directly from the second device.

33. A system, comprising:
- a first device having at least one first programmable integrated circuit coupled to radio circuitry of the first device;
- a second device having at least one second programmable integrated circuit coupled to radio circuitry of the second device;
- where the second programmable integrated circuit of the second device is programmed to control operation of the second device to transmit a radio frequency (RF) signal directly from the second device to the first device; and
- where the first programmable integrated circuit of the first device is programmed to operate the first device to:
  - receive the RF signal at the first device, the RF signal conveying audio data and being transmitted directly to the first device from the second device,
  - measure one or more RF signal reception or transmission characteristics of the RF signal as it is received at the first device directly from the second device,
  - produce modified audio data at the first device by modifying information of the conveyed audio data as it is received at the first device directly from the second device based on the measured RF signal reception or transmission characteristics of the RF signal only as it is received at the first device directly from the second device, and reproduce analog audio acoustic sound waves from the modified audio data;

where the first device comprises at least a first speaker and a second speaker; where the audio data comprises at least first channel audio data and second channel audio data; and where the first programmable integrated circuit is further programmed to operate the first device to:

produce the modified audio data at the first device by individually varying volume level and/or pitch level information of the first channel audio data relative to volume level and/or pitch level information of the second channel audio data based on the measured RF signal reception or transmission characteristics of the RF signal received from the second device, and simultaneously reproduce analog audio acoustic sound waves from the first channel information of the modified audio data at the first speaker of the first device and reproduce analog audio acoustic sound waves from the second channel information of the modified audio data at the second speaker of the first device.

34. The system of claim 33, where the first device comprises a portable wireless audio data receiver system that comprises a first speaker configured to be worn adjacent a left ear of a human user and a second speaker configured to be worn adjacent a right ear of the same human user; and where the first programmable integrated circuit is further programmed to operate the first device to:

determine at least one of position, orientation and/or direction of the first device relative to the second device based on the measured one or more RF signal reception or transmission characteristics of the received RF signal at the first device;

produce the modified audio data at the first device by individually varying volume level and/or pitch level information of the first channel audio data relative to volume level and/or pitch level information of the second channel audio data based on the determined position, orientation and/or direction of the first device relative to the second device to produce modified audio data having first and second audio channels that have different volume level and/or pitch level information relative to each other such that the volume level information and/or pitch level information of the first channel audio data is different from the volume level information and/or pitch level information of the second channel audio data to indicate to a user of the first device the direction from which the RF signal is received; and simultaneously reproduce analog audio acoustic sound waves from the first channel information of the modified audio data at the first speaker of the portable wireless audio data receiver system and reproducing analog audio acoustic sound waves from the second channel information of the modified audio data at the second speaker of the portable wireless audio data receiver system.

35. A system, comprising:

a first device having at least one first programmable integrated circuit coupled to radio circuitry of the first device;

a second device having at least one second programmable integrated circuit coupled to radio circuitry of the second device;

where the second programmable integrated circuit of the second device is programmed to control operation of the second device to transmit a radio frequency (RF) signal from the second device to the first device; and where the first programmable integrated circuit of the first device is programmed to operate the first device to:

receive the RF signal at the first device, the RF signal conveying audio data and being transmitted from the second device, measure one or more RF signal reception or transmission characteristics of the RF signal as it is received at the first device, produce modified audio data at the first device by modifying information of the conveyed audio data based on the measured RF signal reception or transmission characteristics, and reproduce analog audio acoustic sound waves from the modified audio data;

where the first device comprises one or more speakers; where at least the first device is movable relative to the second device or the second device is movable relative to the first device while the second device; and where the first programmable integrated circuit is further programmed to operate the first device to:

make at least two measurements of the one or more RF signal reception or transmission characteristics of the received RF signal at the first device, the two measurements being made at sequential times that correspond to sequential different relative positions between the second device and the first device while at least one of the first device is moving relative to the second device or the second device is moving relative to the first device;

compare the at least two sequential measurements of RF signal reception or transmission characteristics to determine a real time rate of change of the RF signal reception or transmission characteristics as a function of time;

produce the modified audio data at the first device by varying pitch information of the audio data based on the real time change in measured RF signal reception or transmission characteristics of the RF signal received from the second device as a function of time; and reproduce analog audio acoustic sound waves from the modified audio data at the one or more speakers of the first device to simulate a Doppler effect.

* * * * *